(12) United States Patent
Yamamoto et al.

(10) Patent No.: US 9,068,871 B2
(45) Date of Patent: Jun. 30, 2015

(54) FLOW RATE MEASURING DEVICE

(75) Inventors: Katsuyuki Yamamoto, Kasatsu (JP);
Naotsugu Ueda, Kasatsu (JP)

(73) Assignee: OMRON Corporation, Kyoto (JP)

( * ) Notice: Subject to any disclaimer, the term of this patent is extended or adjusted under 35 U.S.C. 154(b) by 64 days.

(21) Appl. No.: 14/112,243

(22) PCT Filed: Apr. 18, 2012

(86) PCT No.: PCT/JP2012/060470
§ 371 (c)(1),
(2), (4) Date: Nov. 18, 2013

(87) PCT Pub. No.: WO2012/147586
PCT Pub. Date: Nov. 1, 2012

(65) Prior Publication Data
US 2014/0069205 A1    Mar. 13, 2014

(30) Foreign Application Priority Data
Apr. 28, 2011 (JP) ................. 2011-101998

(51) Int. Cl.
*G01F 1/688* (2006.01)
*G01F 1/68* (2006.01)
*G01F 1/684* (2006.01)
*G01F 5/00* (2006.01)

(52) U.S. Cl.
CPC *G01F 1/68* (2013.01); *G01F 1/684* (2013.01); *G01F 1/6842* (2013.01); *G01F 1/6845* (2013.01); *G01F 1/688* (2013.01); *G01F 5/00* (2013.01)

(58) Field of Classification Search
CPC .............. G01F 1/86; G01F 1/37; G01F 1/38; G01F 1/44
USPC .............. 73/204.26, 861.52, 861.47, 861.63, 73/861.02
See application file for complete search history.

(56) References Cited

U.S. PATENT DOCUMENTS 5,237,523 A    8/1993 Bonne et al.
5,515,714 A    5/1996 Sultan et al.
(Continued)

FOREIGN PATENT DOCUMENTS

| JP | 02-222815 A | 9/1990 |
|----|-------------|--------|
| JP | 04-047228 A | 2/1992 |
| JP | 2001-512231 A | 8/2001 |
| JP | 2001-355800 A | 12/2001 |
| WO | 01/18500 A1 | 3/2001 |

OTHER PUBLICATIONS

Extended European Search Report for Application No. 12776213.6 issued Oct. 8, 2014 (6 pages).
(Continued)

*Primary Examiner* — Jewel V Thompson
(74) *Attorney, Agent, or Firm* — Nutter McClennen & Fish LLP; John J. Penny, Jr.; Michael P. Visconti, III

(57) ABSTRACT

A flow rate measuring device includes: a flow rate sensor; a physical property sensor having a micro heater and a thermopile; and a sub-flow path portion having a physical property detecting flow path in which the physical property sensor is disposed. The micro heater and the thermopile are disposed side by side in a direction orthogonal to a flow direction of a fluid to be measured, and the flow rate sensor is disposed at a position except for the physical property detecting flow path.

15 Claims, 14 Drawing Sheets

(56) References Cited

U.S. PATENT DOCUMENTS

| | | |
|---|---|---|
| 6,662,121 B1 | 12/2003 | Oda et al. |
| 8,467,050 B2 * | 6/2013 | Dutel .......................... 356/246 |
| 2006/0059985 A1 | 3/2006 | Seki et al. |

OTHER PUBLICATIONS

International Search Report for Application No. PCT/JP2012/060470 mailed Jul. 10, 2012 (4 Pages).

* cited by examiner

FLOW RATE MEASURING DEVICE

CROSS-REFERENCE TO RELATED APPLICATION(S)

This application claims the benefit of priority from Japanese Patent Application No. 2011-101998, filed 28 Apr. 2011, and International Application No. PCT/JP2012/060470, filed 18 Apr. 2012 and designating the United States, the entire contents of which is incorporated herein by reference for all purposes.

BACKGROUND

The present invention relates to a flow rate measuring device for measuring a flow rate of a fluid flowing in a flow path, and more specifically, relates to a flow rate measuring device capable of measuring the flow rate with high accuracy by reducing a change of output characteristics caused by a physical property change of the fluid.

Heretofore, in order to measure a flow rate of a fluid such as gas flowing in a flow path (hereinafter, referred to as "a fluid to be measured"), a thermal flow rate measuring device that measures the flow rate of the fluid to be measured, based on a change of a temperature distribution in the flow path, is used.

FIG. 13 (a) and FIG. 13 (b) are schematic views for explaining the change of the temperature distribution in the thermal flow rate measuring device. FIG. 13 (a) shows a temperature distribution in a state where the fluid to be measured does not flow, and FIG. 13 (b) shows a temperature distribution in a state where the fluid to be measured flows.

As shown in FIG. 13 (a), in a state where the fluid to be measured does not flow, the fluid to be measured, which is present on a periphery of a micro heater 181, is heated by the micro heater 181. Therefore, in the micro heater 181, a uniform temperature distribution is generated over a thermopile 182 disposed on an upstream side of the micro heater 181 and a thermopile 183 disposed on a downstream side of the micro heater 181.

When the fluid to be measured flows in an arrow direction of the drawings in such a state, as shown in FIG. 13 (b), a temperature distribution on the periphery of the micro heater 181 is biased to a downstream side of the flow of the fluid to be measured, that is, to the thermopile 183 side. Therefore, on the thermopile 182, a lower temperature than in the state where the fluid to be measured does not flow is detected, and on the thermopile 183, a higher temperature than in the state where the fluid to be measured flows is detected.

As described above, in the thermal flow rate measuring device, the flow rate of the fluid to be measured, which flows in the flow path, is calculated based on a difference between temperatures detected by the thermopile 182 and the thermopile 183, whereby it is made possible to measure the flow rate with high accuracy.

However, when a type or composition of the fluid to be measured is changed, a physical property such as thermal conductivity, specific heat, viscosity and density is also changed. Therefore, in the conventional thermal flow rate measuring device, there has been a problem that output characteristics are changed in response to the physical property of the fluid to be measured.

FIG. 14 (a) and FIG. 14 (b) are schematic views showing temperature distributions when Gas A and Gas B which have different physical properties, individually flow through a flow path 121 at a predetermined flow rate (L/min), and FIG. 15 is a graph showing relationships between the flow rates (L/min) of the Gas A and the Gas B, which are shown in FIG. 14 (a) and FIG. 14 (b), and output values (V) of the flow rate measuring device.

As shown in FIG. 14 (a) and FIG. 14 (b), even in the case where such fluids to be measured, which have the same flow rate, are flown through the flow path 121, such a temperature distribution on the periphery of the micro heater 181 is different between the Gas A and the Gas B which have different physical properties.

Therefore, as shown in FIG. 15, between the Gas A and the Gas B which have different physical properties, the output value (V) of the flow rate measuring device is changed even at the same flow rate, and a variation is increased with an increase of the flow rate of the fluid to be measured.

As described above, in the conventional thermal flow rate measuring device, in the case where the physical property of the fluid to be measured is changed, the output characteristics of the flow rate measuring device are changed, and accordingly, it has been difficult to measure the flow rate with high accuracy.

For such a problem as described above, Japanese Unexamined Patent Publication "Patent No. 4050857 (registered in Dec. 7, 2007) (Patent Document 1) and Patent Document 2: United States Patent Publication "U.S. Pat. No. 5,237,523 (registered in Aug. 17, 1993)" (Patent Document 2) disclose flow rate measuring devices, each of which includes a physical property sensor that detects the physical property of the fluid to be measured.

FIG. 16 is a top view showing a configuration of a micro flow sensor 207 including the flow rate measuring device disclosed in Patent Document 1, and FIG. 17 is a perspective view showing an exterior appearance of a flow rate measuring device 301 disclosed in Patent Document 2.

As shown in FIG. 16, in the micro flow sensor 207 of Patent Document 1, thermopiles 282 and 283 for measuring the flow rate and thermopiles 272 and 273 for detecting the physical property are disposed along four sides of a micro heater 281 on a substrate 205.

Specifically, with respect to the flow direction R of the fluid to be measured, the thermopile 282 for measuring the flow rate is disposed on an upstream side of the micro heater 281, and the thermopile 283 for measuring the flow rate is disposed on a downstream side of the micro heater 281. Moreover, the thermopiles 272 and 273 for detecting the physical property are respectively disposed on both ends of the micro heater 281 in a longitudinal direction (that is, a direction orthogonal to the flow direction R).

Moreover, as shown in FIG. 17, in the flow rate measuring device 301 of Patent Document 2, a flow rate sensor 308 is disposed on an inner wall of a main flow path 321, and a physical property sensor 307 is disposed inside a cell 336 divided from the main flow path 321.

According to Patent Document 1 and Patent Document 2, the physical property of the fluid to be measured is calculated based on an output value of the physical property sensor, and the flow rate of the fluid to be measured is corrected by using the calculated physical property, whereby the change of the output characteristics of the flow rate measuring device, which results from such a physical property change of the fluid to be measured, can be reduced.

Here, the flow rate sensors and the physical property sensors have specific detection ranges. If the flow rate of the fluid to be measured goes out of the detection ranges, the measurement accuracy is lowered or it may be impossible to measure the flow rate. Therefore, in order to enhance the measurement accuracy of the flow rate measuring device, optimum flow rates corresponding to the detection ranges of the flow rate sensor and the physical property sensor may be individually controlled.

However, in the technology of Patent Document 1, a configuration is formed, in which the thermopiles 282 and 283 for detecting the flow rate and the thermopiles 272 and 273 for detecting the physical property, both being provided on the substrate 205, are disposed in the same flow path. Therefore, the optimum flow rates cannot be individually controlled for each of the flow rate sensor and the physical property sensor.

Therefore, in the technology of Patent Document 1, the output characteristics of the physical property sensor (thermopiles 272 and 273 for detecting the physical property) change with the flow rate of the fluid to be measured. Accordingly, for the calculated physical property, a correction corresponding to the flow rate of the fluid to be measured may be performed. That is to say, as shown in the following Expression (1), the physical property (coefficient) detected for correction of the flow rate output value, may be corrected by using the flow rate output value before correction.

[Expression 1]

Flow rate output value after correction=flow rate output value before correction×(coefficient corresponding to physical property×flow rate output value before correction)    Expression (1)

Hence, in the technology of Patent Document 1, an error by the physical property cannot be corrected completely, and accordingly, the flow rate of the fluid to be measured cannot be measured with high accuracy.

Moreover, in the technology of Patent Document 2, there is formed a configuration in which the main flow path 321 and the cell 336 is in fluid communication with each other by one pipe. Accordingly, an inflow and outflow of the fluid to be measured to and from the cell 336 are stagnated, and efficient substitution cannot be performed for the fluid to be measured in the cell 336.

Therefore, in the technology of Patent Document 2, for example, in the case where the physical property of the fluid to be measured is changed, the fluid to be measured which flows on a periphery of the physical property sensor 307 disposed in the cell 336, and the fluid to be measured which flows on a periphery of the flow rate sensor 308 disposed in the main flow path 321, differ in physical property from each other. Hence, an appropriate physical property cannot be detected by the physical property sensor 307.

Hence, in the technology of Patent Document 2, an accurate correction by the physical property cannot be made, and accordingly, the flow rate of the fluid to be measured cannot be measured with high accuracy.

SUMMARY

Disclosed is an embodiment to provide a flow rate measuring device capable of measuring the flow rate of the fluid to be measured with high accuracy by reducing the change of the output characteristics caused by the physical property change of the fluid to be measured.

In an embodiment, disclosed is a flow rate measuring device including: a flow rate detection unit configured to detect a flow rate of a fluid to be measured, the fluid flowing through a main flow path; a physical property detection unit configured to detect a physical property of the fluid to be measured, the physical property detection unit including a heating unit configured to heat the fluid to be measured and a temperature detection unit configured to detect a temperature of the fluid to be measured; a sub-flow path portion in which one end is in fluid communication with a first inflow port open in the main flow path and the other end is in fluid communication with a first outflow port open in the main flow path, the sub-flow path portion including a physical property detection flow path in which the physical property detection unit is disposed; and a flow rate correction unit configured to correct the flow rate of the fluid to be measured, the flow rate being calculated based on a detection signal outputted from the flow rate detection unit, by using the physical property of the fluid to be measured, the physical property being calculated based on a detection signal outputted from the physical property detection unit, wherein the heating unit and the temperature detection unit are disposed side by side in a direction orthogonal to a flow direction of the fluid to be measured, and the flow rate detection unit is disposed at a position except for the physical property detection flow path.

Therefore, an effect of the invention is that the flow rate measuring device capable of measuring with high accuracy the flow rate of the fluid to be measured, by reducing the change of the output characteristics caused by the physical property change of the fluid to be measured, can be realized.

DESCRIPTION

Based on FIG. 1 to FIG. 9, an embodiment of a flow rate measuring device is described as follows. In this embodiment, the case of measuring a flow rate of a fluid (hereinafter, referred to as a fluid to be measured) such as gas by using the flow rate measuring device is described.

(1) Configuration of Flow Rate Measuring Device

First, a configuration of the flow rate measuring device according to this embodiment with reference to FIG. 1 to FIG. 4 is described.

Figure 1:
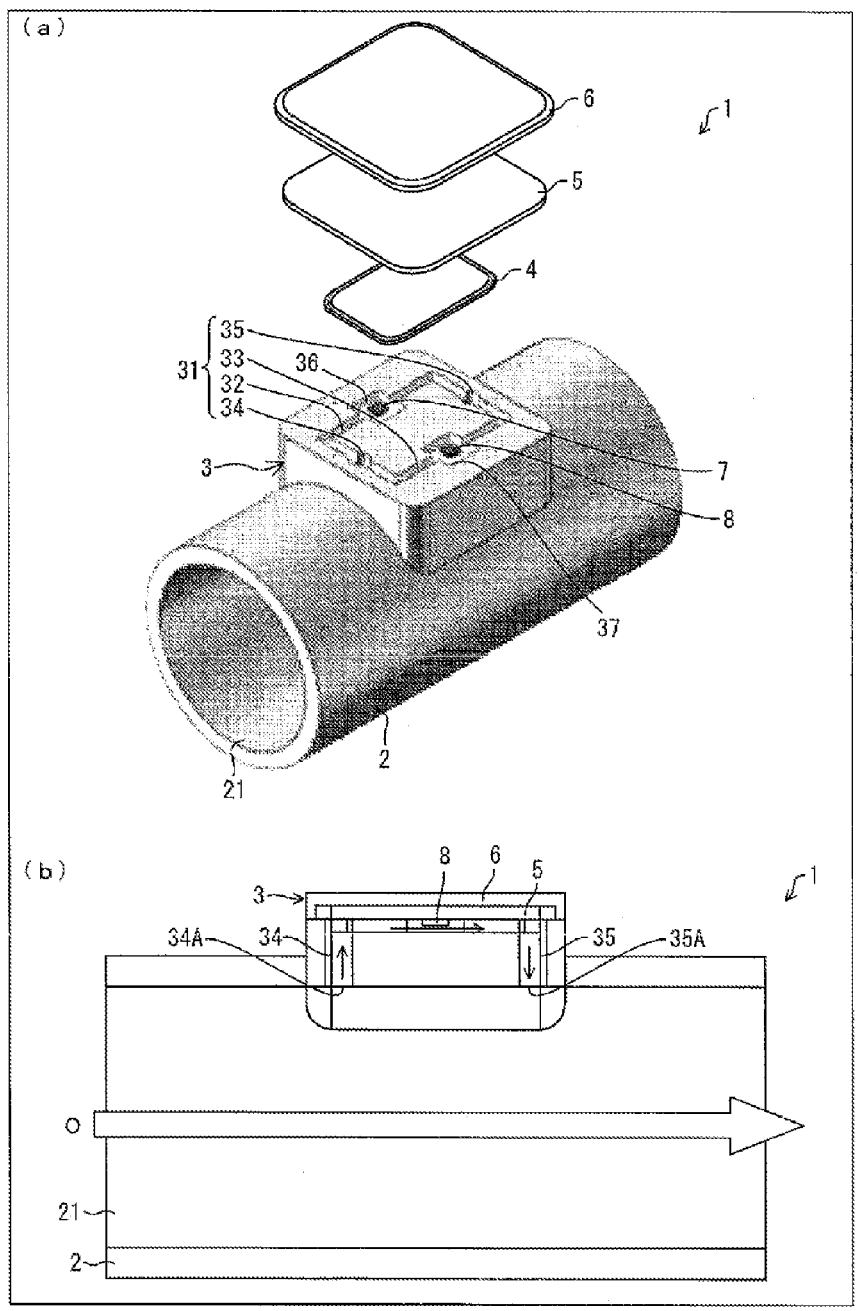
FIG. 1 (a) is an exploded perspective view showing a flow rate measuring device according to an embodiment, and FIG. 1 (b) is a transparent view showing the flow rate measuring device shown in FIG. 1 (a).

FIG. 1 (*a*) is an exploded perspective view showing a flow rate measuring device 1 according to this embodiment, and FIG. 1 (*b*) is a transparent view showing the flow rate measuring device 1 shown in FIG. 1 (*a*).

As shown in FIG. 1 (*a*) and FIG. 1 (*b*), the flow rate measuring device 1 includes: a main flow path portion 2 in which a main flow path 21 is formed; a sub-flow path portion 3 in which a sub-flow path 31 is formed; a seal 4; a circuit board 5; and a cover 6.

The main flow path portion 2 is a tubular member in which the main flow path 21 extending through the main flow path portion 2 in a longitudinal direction is formed. On an inner circumferential surface of the main flow path portion 2, with respect to a flow direction O of the fluid to be measured, an inflow port (first inflow port) 34A is formed on an upstream side thereof, and an outflow port (first outflow port) 35A is formed on a downstream side thereof.

For example, a length of the main flow path portion 2 in an axial direction is approximately 50 mm, a diameter of the inner circumferential surface thereof (that is, a diameter of the main flow path 21) is approximately 20 mm, and a diameter of an outer circumferential surface of the main flow path portion 2 is approximately 24 mm.

The sub-flow path portion 3 is provided on the main flow path portion 2 (specifically, on the outer circumferential surface thereof). Inside and on an upper surface of the sub-flow path portion 3, the sub-flow path 31 is formed. One end of the sub-flow path 31 is in fluid communication with the inflow port 34A, and the other end thereof is in fluid communication with the outflow port 35A.

In the flow rate measuring device 1, the sub-flow path 31 includes an inflow flow path 34, a physical property detecting flow path 32, a flow rate detecting flow path 33, and an outflow flow path 35.

The inflow flow path 34 is a flow path for allowing the fluid to be measured, which flows through the main flow path 21, to flow thereinto, and for branching the fluid to be measured to the physical property detecting flow path 32 and the flow rate detecting flow path 33. The inflow flow path 34 is formed to extend through the sub-flow path portion 3 in a direction perpendicular to the main flow path 21. One end of the inflow flow path 34 is in fluid communication with the inflow port 34A, and the other end thereof is made open on the upper surface of the sub-flow path portion 3 and is in fluid communication with (that is, is branched to) the physical property detecting flow path 32 and the flow rate detecting flow path 33. In such a way, a part of the fluid to be measured, which flows through the main flow path 21, can be allowed to branch to the physical property detecting flow path 32 and the flow rate detecting flow path 33 through the inflow flow path 34.

The physical property detecting flow path (physical property detection flow path) 32 is a flow path with a substantial U-shape, which is formed on the upper surface of the sub-flow path portion 3 and extends in a direction parallel to the main flow path 21. One end of the physical property detecting flow path 32 is in fluid communication with the inflow port 34A through the inflow flow path 34, and the other end thereof is in fluid communication with the outflow port 35A through the outflow flow path 35. This physical property detecting flow path 32 has a physical property detection region 36, in which a physical property sensor (physical property detection unit) 7 for detecting the physical property of the fluid to be measured is disposed, in a portion extending in a longitudinal direction (the direction parallel to the main flow path 21).

The flow rate detecting flow path (flow rate detection flow path) 33 is a flow path with a substantial U-shape, which is formed on the upper surface of the sub-flow path portion 3 and extends in the direction parallel to the main flow path 21. One end of the flow rate detecting flow path 33 is in fluid communication with the inflow port 34A through the inflow flow path 34, and the other end thereof is in fluid communication with the outflow port 35A through the outflow flow path 35. This flow rate detecting flow path 33 has a flow rate detection region 37, in which a flow rate sensor (flow rate detection unit) 8 for detecting the flow rate of the fluid to be measured is disposed, in a portion extending in a longitudinal direction (the direction parallel to the main flow path 21).

Note that, in the drawings, the physical property sensor 7 and the flow rate sensor 8 and the circuit board 5 are illustrated in a state of being separated from each other for convenience of explanation. However, the physical property sensor 7 and the flow rate sensor 8 may also be disposed in the physical property detection region 36 and the flow rate detection region 37, respectively in a state of being mounted on the circuit board 5.

The outflow flow path 35 is a flow path for allowing the fluid to be measured, which has passed through the physical property detecting flow path 32 and the flow rate detecting flow path 33, to flow out to the main flow path 21. The outflow flow path 35 is formed to extend through the sub-flow path portion 3 in the direction perpendicular to the main flow path 21. One end of the outflow flow path 35 is in fluid communication with the outflow port 35A, and the other end thereof is made open on the upper surface of the sub-flow path portion 3, and is in fluid communication with the physical property detecting flow path 32 and the flow rate detecting flow path 33. In such a way, the fluid to be measured, which has passed through the physical property detecting flow path 32 and the flow rate detecting flow path 33, can flow out to the main flow path 21 through the outflow flow path 35 without stagnation.

As described above, the fluid to be measured, which flows in from the same inflow port 34A, is branched to the physical property detecting flow path 32 and the flow rate detecting flow path 33, whereby the physical property sensor 7 and the flow rate sensor 8 can detect the physical property and the flow rate based on flows of the fluid to be measured, in which conditions such as temperatures and concentrations are equal to each other. Hence, measurement accuracy of the flow rate measuring device 1 can be enhanced.

Note that, in the flow rate measuring device 1, after the seal 4 is fitted into the sub-flow path portion 3, the circuit board 5 is disposed, and further the circuit board 5 is fixed to the sub-flow path portion 3 by the cover 6, whereby air tightness inside the sub-flow path portion 3 is ensured.

Figure 2:
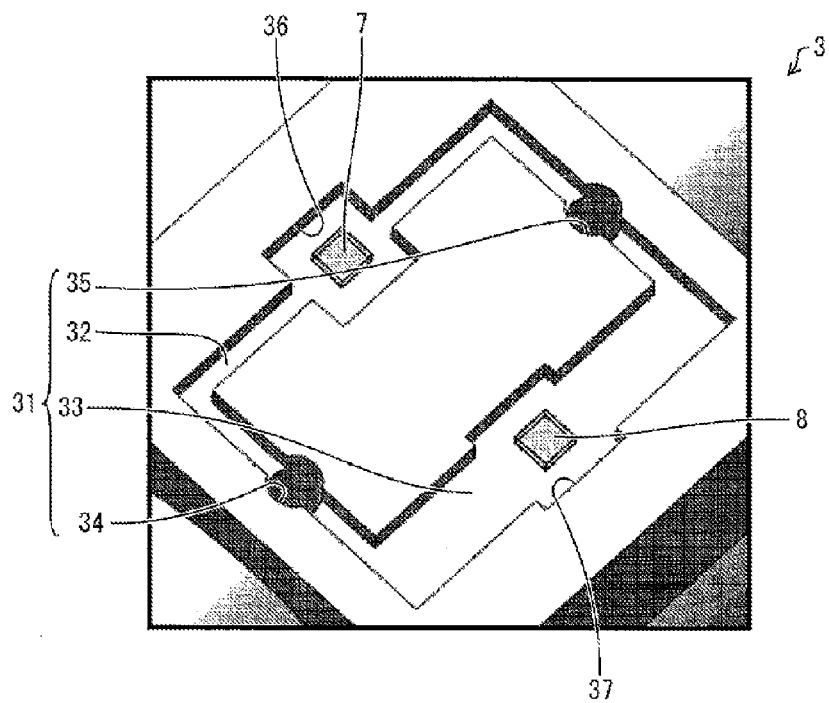
FIG. 2 is a perspective view showing a sub-flow path portion shown in FIG. 1.

FIG. 2 is a perspective view showing the sub-flow path portion 3 shown in FIG. 1 (a). As shown in FIG. 2, the physical property detecting flow path 32 has one end communicating with the inflow flow path 34 and the other end communicating with the outflow flow path 35. In a similar way, the flow rate detecting flow path 33 has one end communicating with the inflow flow path 34 and the other end communicating with the outflow flow path 35.

Moreover, both end portions of the physical property detecting flow path 32 and both end portions of the flow rate detecting flow path 33 also communicate with each other, and the physical property detecting flow path 32 and the flow rate detecting flow path 33 form a quadrangular flow path on the upper surface of the sub-flow path portion 3.

In the flow rate measuring device 1, each of the physical property detection region 36 and the flow rate detection region 37 has a shape of square when viewed in a direction perpendicular to the upper surface of the sub-flow path portion 3, and the physical property detection region 36 and the flow rate detection region 37 are positioned substantially symmetrical to each other with respect to a straight line that connects the inflow flow path 34 and the outflow flow path 35.

For example, each of a length of one side of the physical property detection region 36 and a length of one side of the flow rate detection region 37 is approximately 4 mm.

In this embodiment, each shape of the physical property detection region 36 and the flow rate detection region 37 is a square. However, It will be appreciated that the shape of the physical property detection region 36 and the flow rate detection region 37 is not limited to a square and may be configured to enable the physical property sensor 7 and the flow rate sensor 8 to be disposed on the physical property detection region 36 and the flow rate detection region 37. For example, each shape of the physical property detection region 36 and the flow rate detection region 37 may be configured based on a shape of the physical property sensor 7 and the flow rate sensor 8 which are to be disposed.

Hence, for example, in the case where the size of the physical property sensor 7 is smaller than a width of the physical property detecting flow path 32, a width of the physical property detection region 36 may coincide with the width of the physical property detecting flow path 32. In this case, a portion of the physical property detection region 36, which extends in a longitudinal direction of the physical property detecting flow path 32, is formed into a linear shape. Note that this also applies to the flow rate detection region 37 in a similar way.

Figure 3:
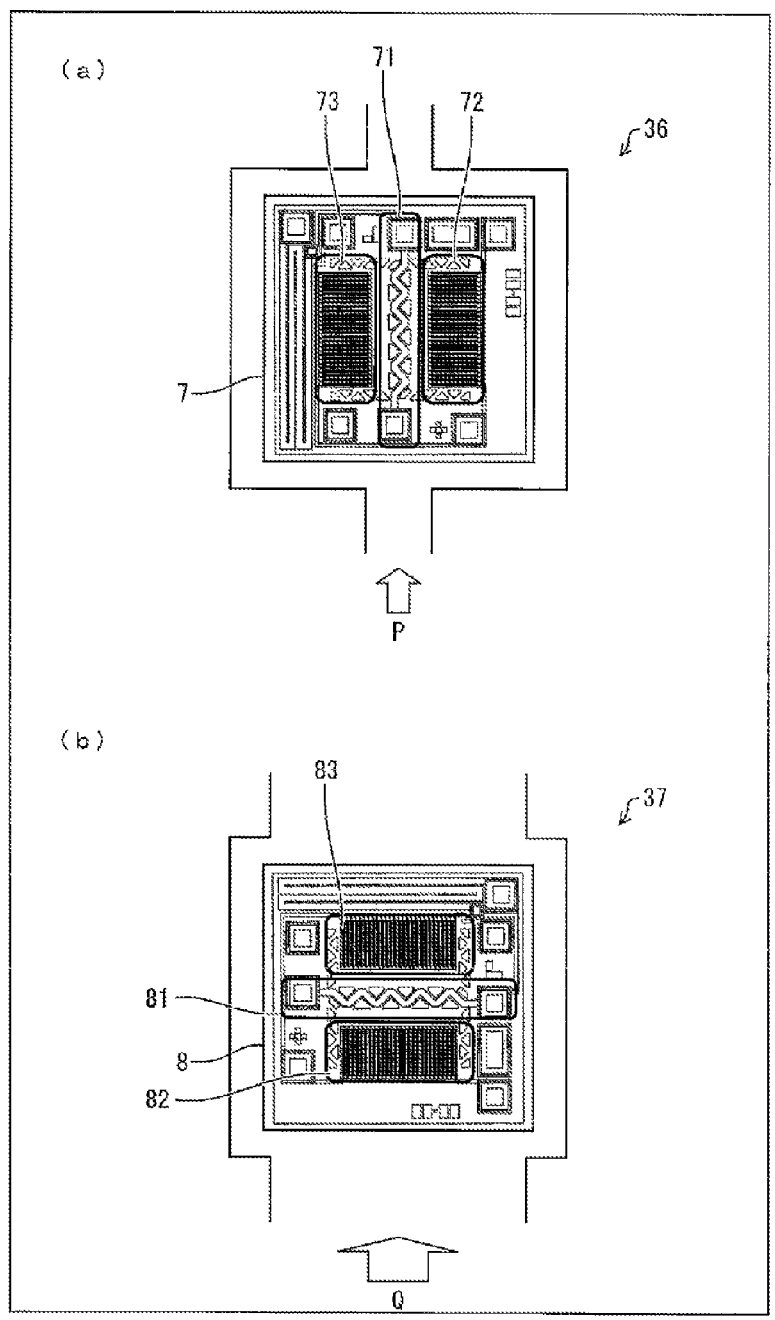
FIG. 3 (a) is a top view showing a schematic configuration of a physical property sensor shown in FIG. 2, and FIG. 3 (b) is a top view showing a schematic configuration of a flow rate sensor shown in FIG. 2.

FIG. 3 (a) is a top view showing a schematic configuration of the physical property sensor 7 shown in FIG. 2, and FIG. 3 (b) is a top view showing a schematic configuration of the flow rate sensor 8 shown in FIG. 2.

As shown in FIG. 3 (a), the physical property sensor 7 includes: a micro heater (heating unit) 71 that heats the fluid to be measured; and a first physical property thermopile (temperature detection unit) 72 and a second physical property thermopile (temperature detection unit) 73, which detect a temperature of the fluid to be measured. In the physical property detection region 36, the micro heater 71, the first physical property thermopile 72 and the second physical property thermopile 73 are disposed side by side in a direction orthogonal to the flow direction of the fluid to be measured.

The first physical property thermopile 72 and the second physical property thermopile 73 are disposed bilaterally symmetrically while sandwiching the micro heater 71 therebetween, and detect temperatures of symmetrical positions on both sides of the micro heater 71.

Here, a temperature distribution is biased to the downstream side by the flow of the fluid to be measured, and accordingly, a variation of a temperature distribution in the direction orthogonal to the flow direction is small in comparison with a variation of a temperature distribution in the flow direction of the fluid to be measured. Therefore, the first physical property thermopile 72, the micro heater 71 and the second physical property thermopile 73 are disposed in this order side by side in the direction orthogonal to the flow direction of the fluid to be measured, whereby changes of output characteristics of the first physical property thermopile 72 and the second physical property thermopile 73, which are caused by the change of the temperature distribution, can be reduced. Hence, an influence of the change of the temperature distribution, which is caused by the flow of the fluid to be measured, is reduced, whereby detection accuracy by the physical property sensor 7 can be enhanced.

Moreover, the micro heater 71 is disposed so that a longitudinal direction of the micro heater 71 is along the flow direction of the fluid to be measured. Accordingly, the micro heater 71 becomes capable of heating the fluid to be measured over a wide range across the flow direction of the fluid to be measured. Therefore, even in the case where the temperature distribution is biased to the downstream side by the flow of the fluid to be measured, it becomes easy to detect the temperature of the fluid to be measured by the first physical property thermopile 72 and the second physical property thermopile 73. Accordingly, the changes of the output characteristics of the first physical property thermopile 72 and the second physical property thermopile 73 can be reduced. Hence, the influence of the change of the temperature distribution, which is caused by the flow of the fluid to be measured, is reduced, whereby the detection accuracy by the physical property sensor 7 can be enhanced.

Moreover, the first physical property thermopile 72 and the second physical property thermopile 73 are disposed so that longitudinal directions of the first and second physical property thermopiles 72, 73 are along the flow direction of the fluid to be measured. Accordingly, the first physical property thermopile 72 and the second physical property thermopile 73 become capable of detecting the temperature over the wide range across the flow direction of the fluid to be measured. Therefore, even in the case where the temperature distribution is biased to the downstream side by the flow of the fluid to be measured, it becomes easy to detect the temperature of the fluid to be measured by the first physical property thermopile 72 and the second physical property thermopile 73. Accordingly, the changes of the output characteristics of the first physical property thermopile 72 and the second physical property thermopile 73 can be reduced. Hence, the influence of the change of the temperature distribution, which is caused by the flow of the fluid to be measured, is reduced, whereby the detection accuracy by the physical property sensor 7 can be enhanced.

Meanwhile, as shown in FIG. 3 (b), the flow rate sensor 8 includes: a micro heater 81 that heats the fluid to be measured; and a first flow rate thermopile 82 and a second flow rate thermopile 83, which detect the temperature of the fluid to be measured. The micro heater 81, the first flow rate thermopile 82 and the second flow rate thermopile 83 are disposed side by side in the flow direction of the fluid to be measured in the flow rate detection region 37.

The first flow rate thermopile 82 is disposed on an upstream side of the micro heater 81, the second flow rate thermopile 83 is disposed on a downstream side of the micro heater 81, and the first flow rate thermopile 82 and the second flow rate thermopile 83 detect temperatures of symmetrical positions while sandwiching the micro heater 81 therebetween.

In the flow rate measuring device 1, for the physical property sensor 7 and the flow rate sensor 8, sensors with substantially the same structure are used, and are individually disposed while differentiating by disposition angles thereof of 90° with respect to the flow direction of the fluid to be measured. In such a way, the sensors with the same structure are enabled to function as the physical property sensor 7 and the flow rate sensor 8, and accordingly the manufacturing cost of the flow rate measuring device 1 can be reduced.

Here, in the flow rate measuring device 1, the physical property detecting flow path 32 and the flow rate detecting flow path 33 are different in that the respective widths thereof extending in the longitudinal direction are different. Specifically, the width of the flow path provided in the physical property detection region 36 is narrower than the width of the flow path provided in the flow rate detection region 37. In such a way, in the flow rate measuring device 1, the flow rates of the fluid to be measured, which is to be branched to the physical property detecting flow path 32 and the flow rate detecting flow path 33, are controlled individually therein.

Figure 4:
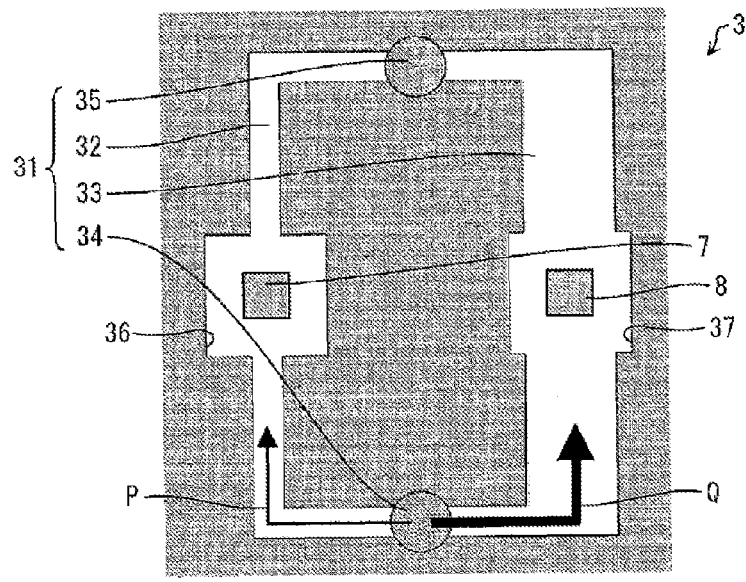
FIG. 4 is a schematic view for explaining a flow rate of a fluid to be measured which branches to a physical property detection flow path shown in FIG. 2 and to a flow rate detecting flow path shown in FIG. 2.

FIG. 4 is a schematic view for explaining the flow rates of the fluid to be measured, which is to be branched to the physical property detecting flow path 32 and the flow rate detecting flow path 33 shown in FIG. 2. As shown in FIG. 4, in this embodiment, the widths of the physical property detecting flow path 32 and the flow rate detecting flow path 33 are set so that the fluid to be measured, in which the flow rate is P, is branched to and flows through the physical property detecting flow path 32, and the fluid to be measured, in which the flow rate is Q, flows through the flow rate detecting flow path 33.

Values of the flow rate P and the flow rate Q vary by the flow rate of the fluid to be measured which flows through the main flow path 21. However, the widths of the physical property detecting flow path 32 and the flow rate detecting flow path 33 are set so that, in the usual using mode, the flow rate P can take a value within a detection range of the physical property sensor 7, and the flow rate Q can take a value within a detection range of the flow rate sensor 8.

For example, the width of the physical property detecting flow path 32 is approximately 0.4 mm, and the width of the flow rate detecting flow path 33 is approximately 0.8 mm.

As described above, in the flow rate measuring device 1, it is possible to individually control the flow rates of the fluid to be measured, which is to be branched to the physical property detecting flow path 32 and the flow rate detecting flow path 33, by adjusting the individual widths thereof. Therefore, the flow rate of the fluid to be measured, which flows through the physical property detection region 36, can be controlled in response to the detection range of the physical property sensor 7, and the flow rate of the fluid to be measured, which flows through the flow rate detection region 37, can be controlled corresponding to the detection range of the flow rate sensor 8.

Hence, the physical property sensor 7 can detect the physical property of the fluid to be measured, at an optimum flow rate corresponding to the specific detection range, and accordingly, the detection accuracy of the physical property sensor 7 can be enhanced.

In a similar way, the flow rate sensor 8 can detect the flow range of the fluid to be measured at an optimum flow rate corresponding to the specific detection range, and accordingly, the detection accuracy of the flow rate sensor 8 can be enhanced.

Figure 5:
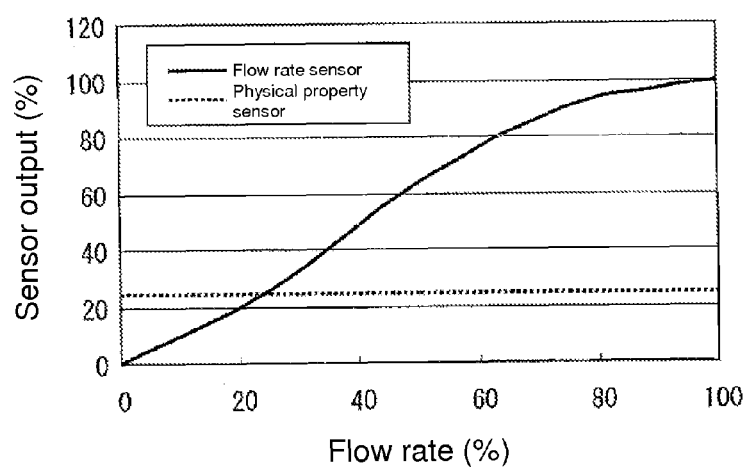
FIG. 5 is a graph showing relationships between flow rates and output values of the physical property sensor and the flow rate sensor, which are shown in FIG. 4.

FIG. 5 is a graph showing relationships between the flow rates and output values of the physical property sensor 7 and the flow rate sensors 8, which are shown in FIG. 4. In FIG. 5, an axis of abscissas represents the flow rates (%), and an axis of ordinates represents the output values (%) of the respective sensors. Maximum flow rates in the detection ranges of the physical property sensor 7 and the flow rate sensor 8 are defined to be 100%, and such sensor output values at the time of the maximum flow rates are defined to be 100%.

As shown in FIG. 5, the output value of the flow rate sensor 8 is increased with an increase of the flow rate of the fluid to be measured which flows through the flow rate detection region 37. In contrast, the output value of the physical property sensor 7 is constant without being affected by the change of the flow rate of the fluid to be measured which flows through the physical property detection region 36.

As described above, in the flow rate measuring device 1, the physical property sensor 7 can detect the physical property of the fluid to be measured, without being affected by the change of the flow rate of the fluid to be measured, and accordingly, the detection accuracy of the physical property can be enhanced.

(2) Configuration of Control Unit

Figure 6:
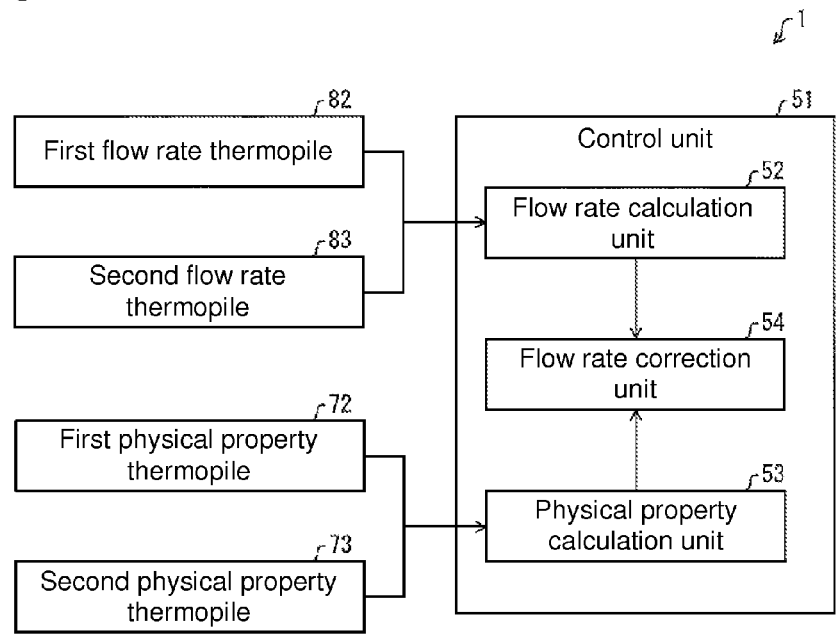
FIG. 6 is a block diagram showing a main unit configuration of a control unit provided in the flow rate measuring device shown in FIG. 1 (a) and FIG. 1 (b).

Next, with reference to FIG. 6, a configuration of the control unit provided in the flow rate measuring device 1 according to this embodiment is described. FIG. 6 is a block diagram showing a main unit configuration of a control unit 51 provided in the flow rate measuring device 1 shown in FIG. 1 (a) and FIG. 1 (b).

As shown in FIG. 6, the control unit 51 includes: a flow rate calculation unit 52; a physical property calculation unit 53; and a flow rate correction unit 54. To the physical property calculation unit 53, the first physical property thermopile 72 and the second physical property thermopile 73 are connected. Moreover, to the flow rate calculation unit 52, the first flow rate thermopile 82 and the second flow rate thermopile 83 are connected.

The flow rate calculation unit 52 is for calculating the flow rate of the fluid to be measured, based on temperature detection signals outputted from the first flow rate thermopile 82 and the second flow rate thermopile 83. Specifically, the flow rate calculation unit 52 calculates a difference between a temperature indicated by the temperature detection signal outputted from the first flow rate thermopile 82 and a temperature indicated by the temperature detection signal outputted from the second flow rate thermopile 83, and calculates the flow rate of the fluid to be measured, based on the difference between the temperatures. Then, the flow rate calculation unit 52 outputs the calculated flow rate of the fluid to be measured to the flow rate correction unit 54.

The physical property calculation unit 53 is for calculating the physical property of the fluid to be measured, based on temperature detection signals (detection signals) outputted from the first physical property thermopile 72 and the second physical property thermopile 73. Specifically, the physical property calculation unit 53 calculates the physical property (for example, a thermal diffusion constant and the like), which is to be decided by thermal conductivity, thermal diffusion, specific heat or the like, based on an average value of temperatures indicated by the temperature detection signals outputted from the first physical property thermopile 72 and the second physical property thermopile 73. The physical property calculation unit 53 outputs the calculated physical property of the fluid to be measured to the flow rate correction unit 54.

The flow rate correction unit 54 is for correcting the flow rate of the fluid to be measured, which is outputted from the physical property calculation unit 53 by using the physical property of the fluid to be measured, which is outputted from the flow rate calculation unit 52. Specifically, by using the physical property of the fluid to be measured, which is outputted from the physical property calculation unit 53, the flow rate correction unit 54 corrects the flow rate of the fluid to be measured, which is outputted from the flow rate calculation unit 52, and then calculates a flow rate after being corrected. The flow rate correction unit 54 displays, on a display, the flow rate after being corrected and so on, and notifies a user of the flow rate concerned.

(3) Processing of Flow Rate Measuring Device

Figure 7:
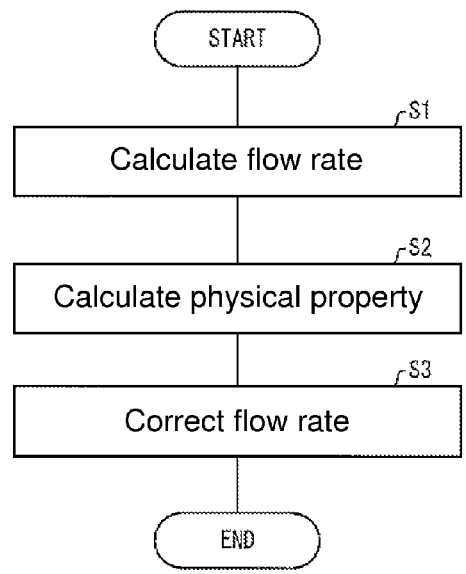
FIG. 7 is a flowchart showing a flow of processing of the control unit shown in FIG. 6.

Next, with reference to FIG. 7, described is a flow of processing of the control unit 51 provided in the flow rate measuring device 1 according to this embodiment. FIG. 7 is a flowchart showing the flow of the processing of the control unit 51 shown in FIG. 6.

As shown in FIG. 7, when the temperature detection signals are outputted from the first flow rate thermopile 82 and the second flow rate thermopile 83, the flow rate calculation unit 52 calculates the flow rate of the fluid to be measured, based on the two temperature detection signals (S1).

Specifically, the flow rate calculation unit 52 calculates the difference between the temperature indicated by the temperature detection signal outputted from the first flow rate thermopile 82 and the temperature indicated by the temperature detection signal outputted from the second flow rate thermopile 83. Then, based on the calculated difference between the temperatures, the flow rate calculation unit 52 calculates the flow rate of the fluid to be measured. The flow rate calculation unit 52 outputs the calculated flow rate of the fluid to be measured to the flow rate correction unit 54.

Note that a publicly known method can be used as a method for calculating the flow rate of the fluid to be measured, based on the temperature detection signals outputted from the first flow rate thermopile 82 and the second flow rate thermopile 83.

Moreover, when the temperature detection signals are outputted from the first physical property thermopile 72 and the second physical property thermopile 73, the physical property calculation unit 53 calculates the physical property of the fluid to be measured, based on the average value of the temperatures indicated by the two temperature detection signals (S2).

Here, a velocity of heat that transmits through the fluid to be measured corresponds to the physical property such as the thermal diffusion constant to be decided by the thermal conductivity, the thermal diffusion, the specific heat or the like. Therefore, a temperature difference between the micro heater 71 and the first physical property thermopile 72 and a temperature difference between the micro heater 71 and the second physical property thermopile 73 are detected, whereby the thermal diffusion constant can be obtained. For example, as the temperature difference between the micro heater 71 and the first physical property thermopile 72 and the temperature difference between the micro heater 71 and the second physical property thermopile 73 become larger, the thermal diffusion constant (thermal conductivity) becomes smaller.

By using such a property as described above, the temperatures of the fluid to be measured are detected by the first physical property thermopile 72 and the second physical property thermopile 73, which are disposed while sandwiching the micro heater 71 therebetween in the direction orthogonal to the flow direction of the fluid to be measured, whereby the physical property of the fluid to be measured can be calculated.

Here, in the flow rate measuring device 1, the flow rate of the fluid to be measured, which flows through the physical property detection region 36, is controlled in response to the detection range of the physical property sensor 7, and accordingly, the first physical property thermopile 72 and the second physical property thermopile 73 can detect heat emitted from the micro heater 71 without being affected by the flow rate of the fluid to be measured.

Therefore, the first physical property thermopile 72 and the second physical property thermopile 73 can output the temperature detection signals to the physical property calculation unit 53 while maintaining constant output characteristics, and accordingly, the physical property calculation unit 53 can calculate the physical property with high accuracy. The physical property calculation unit 53 outputs the calculated physical property of the fluid to be measured to the flow rate correction unit 54.

Next, by using the physical property outputted from the physical property calculation unit 53, the flow rate correction unit 54 corrects the flow rate of the fluid to be measured, which is outputted from the flow rate calculation unit 52, and calculates the flow rate after being corrected (S3). Specifically, by using the following Expression (2), the flow rate correction unit 54 calculates such a flow rate after being corrected.

[Expression 2]

Flow rate output value after correction=flow rate output value before correction×coefficient corresponding to physical property    Expression (2)

As mentioned above, in the flow rate measuring device 1, the output characteristics of the physical property sensor 7 are not affected by the flow rate of the fluid to be measured. Therefore, unlike the conventional art, the flow rate correction unit 54 can correct the flow rate of the fluid to be measured, which is outputted from the flow rate calculation unit 52 without performing the correction corresponding to the flow rate with respect to the physical property of the fluid to be measured which is outputted from the physical property calculation unit 53.

Hence, in accordance with the flow rate measuring device 1, the flow rate of the fluid to be measured which is detected by the flow rate sensor 8 can be appropriately corrected based on the physical property detected by the physical property sensor 7, and accordingly, the flow rate of the fluid to be measured can be measured with high accuracy.

As described above, the flow rate measuring device 1 includes: the flow rate sensor 8 configured to detect the flow rate of the fluid to be measured, which flows through the main flow path 21; the physical property sensor 7 configured to detect the physical property of the fluid to be measured, the physical property sensor 7 having the micro heater 71 configured to heat the fluid to be measured, and the first physical property thermopile 72 and the second physical property thermopile 73, which detect the temperatures of the fluid to be measured; the sub-flow path portion 3, in which one end is in fluid communication with the inflow port 34A open in the main flow path 21, and the other end is in fluid communication with the outflow port 35A open in the main flow path 21, the sub-flow path portion 3 having the physical property detecting flow path 32 in which the physical property sensor 7 is disposed; and the flow rate correction unit 54 configured to correct the flow rate of the fluid to be measured, which is calculated based on the detection signal outputted from the flow rate sensor 8, by using the physical property of the fluid to be measured, which is calculated based on the detection signal outputted from the physical property sensor 7, wherein the micro heater 71 and the first physical property thermopile 72 and the second physical property thermopile 73 are disposed side by side in the direction orthogonal to the flow direction of the fluid to be measured, and the flow rate sensor 8 is disposed at a position except for the physical property detecting flow path 32.

In the flow rate measuring device 1, the physical property sensor 7 is disposed in the physical property detecting flow path 32, and the flow rate sensor 8 is disposed in the flow rate detecting flow path 33. Therefore, for example, the width of the physical property detecting flow path 32 is adjusted, whereby it is made possible to individually control the flow rate of the fluid to be measured, which flows through the physical property detecting flow path 32. In such a way, the output characteristics of the physical property sensor 7 can be suppressed from being changed by the influence of the flow rate of the fluid to be measured, and in addition, it is made possible to effectively suppress generation of turbulence, which is caused by the flow of the fluid to be measured.

Hence, in accordance with the flow rate measuring device 1, the flow rate correction unit 54 can accurately correct the flow rate of the fluid to be measured, which is calculated based on the temperature detection signal outputted from the flow rate sensor 8, by using the physical property with high accuracy, which is calculated based on the temperature detection signal outputted from the physical property sensor 7.

Moreover, in the flow rate measuring device 1, the physical property sensor 7 is disposed in the physical property detecting flow path 32, in which one end is in fluid communication with the inflow port 34A open in the main flow path 21, and the other end is in fluid communication with the outflow port 35A open in the main flow path 21. Therefore, the flow of the fluid to be measured in the physical property detecting flow path 32 is not stagnated, and the fluid to be measured flows smoothly from the inflow port 34A to the outflow port 35A, and accordingly, substitution of the fluid to be measured, which is present on the periphery of the physical property sensor 7, can be performed efficiently.

Hence, in accordance with the flow rate measuring device 1, it is made possible to accurately correct the flow rate of the fluid to be measured, based on the appropriate physical property corresponding to the change of the physical property of the fluid to be measured, which flows through the main flow path 21.

Moreover, the temperature distribution is biased to the downstream side by the flow of the fluid to be measured, and accordingly, the variation of the temperature distribution in the direction orthogonal to the flow direction is small in comparison with the variation of the temperature distribution in the flow direction of the fluid to be measured. Therefore, the first physical property thermopile 72, the micro heater 71 and the second physical property thermopile 73 are disposed side by side in the direction orthogonal to the flow direction of the fluid to be measured, whereby the changes of the output characteristics of the first physical property thermopile 72 and the second physical property thermopile 73, which are caused by the change of the temperature distribution, can be reduced. Hence, the influence of the change of the temperature distribution, which is caused by the flow of the fluid to be measured, is reduced, whereby the detection accuracy by the physical property sensor 7 can be enhanced.

Therefore, the flow rate measuring device 1 capable of measuring with high accuracy the flow rate of the fluid to be measured, by reducing the change of the output characteristics caused by the physical property change of the fluid to be measured, can be realized.

(5) Modification Example

Figure 8:
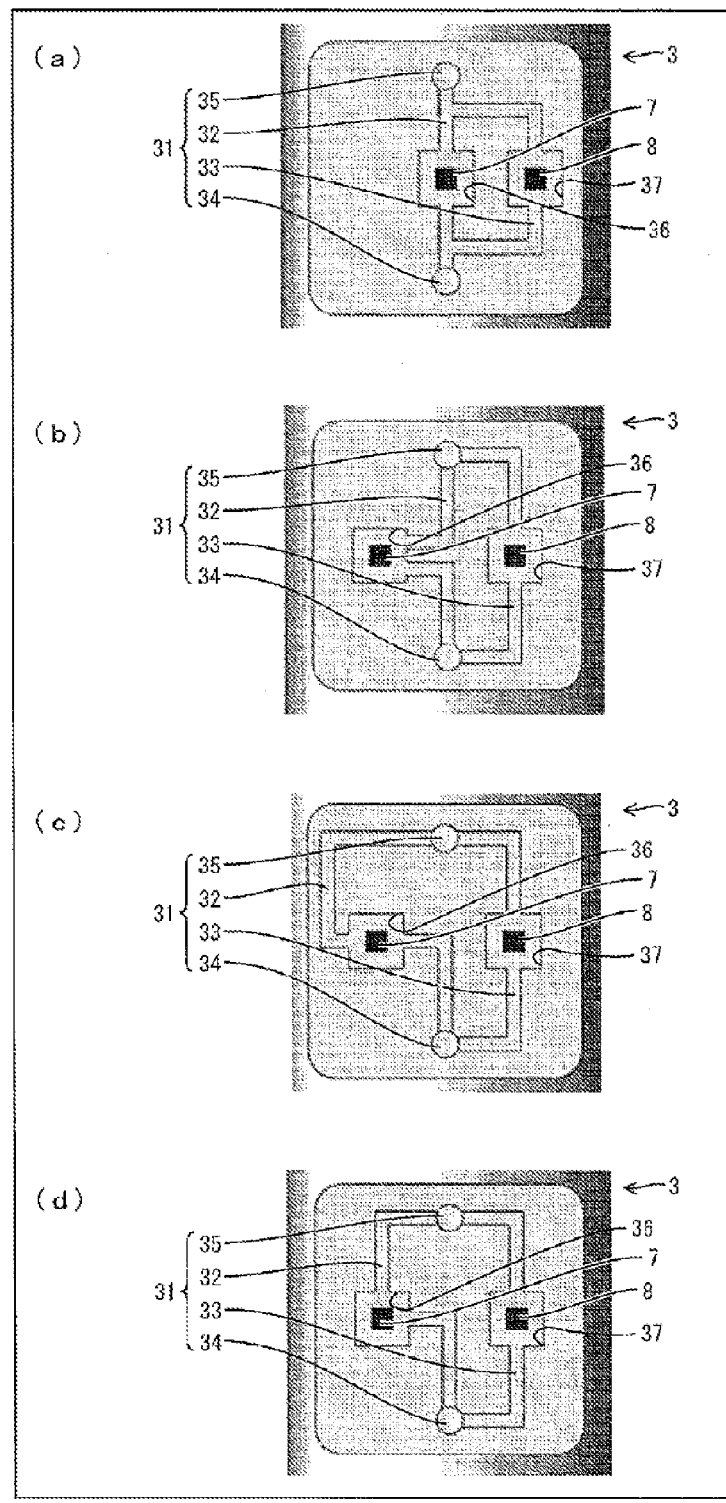
FIG. 8 (a) to FIG. 8 (d) are top views showing modification examples of the physical property detecting flow path and the flow rate detecting flow path, which are formed on an upper surface of the sub-flow path portion shown in FIG. 4.
Figure 9:
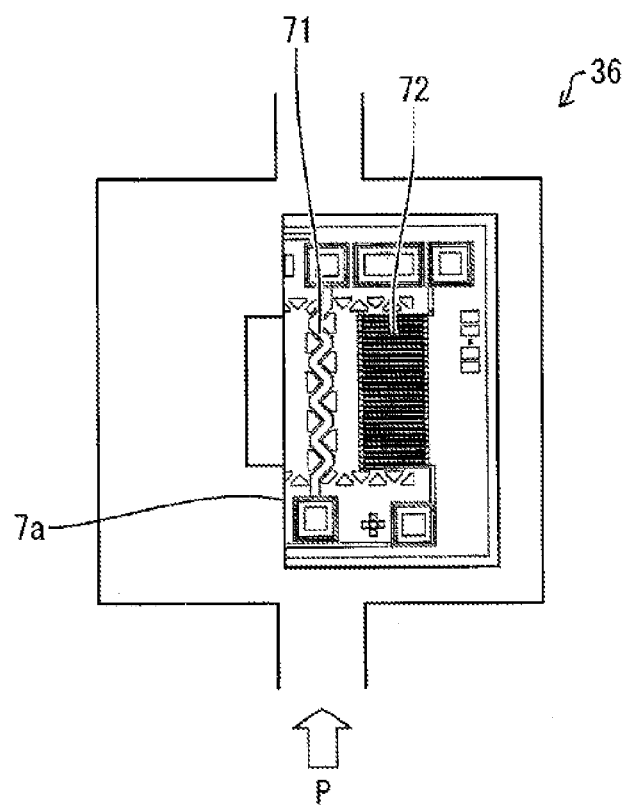
FIG. 9 is a top view showing a schematic configuration of a modification example of the physical property sensor shown in FIG. 3 (a).

Next, with reference to FIG. 8 (a) to FIG. 8 (d) and FIG. 9, described is a modification example of the flow rate measuring device 1.

(5-1) Modification Example 1

As shown in FIG. 4, each of the physical property detecting flow path 32 and the flow rate detecting flow path 33 is formed into the substantial U-shape, whereby the quadrangular flow path is formed on the upper surface of the sub-flow path portion 3. If the physical property detecting flow path 32 and the flow rate detecting flow path 33 are capable of individually controlling the flow rates of the fluid to be measured which passes through the physical property detection region 36 and the flow rate detection region 37, then the shapes thereof are not particularly limited.

FIG. 8 (a) to FIG. 8 (d) are top views each showing modification examples of the physical property detecting flow path 32 and the flow rate detecting flow path 33, which are formed on the upper surface of the sub-flow path portion 3 shown in FIG. 4.

As shown in FIG. 8 (a), for example, the physical property detecting flow path 32 may be formed into a linear shape that connects the inflow flow path 34 and the outflow flow path 35 to each other, and the flow rate detecting flow path 33 may be formed into the substantial U-shape.

Moreover, as shown in FIG. 8 (b) to FIG. 8 (d), the physical property detecting flow path 32 may be formed so as to allow the fluid to be measured to flow into the physical property detection region 36 in a direction orthogonal to the direction where the fluid to be measured flows into the flow rate detection region 37.

In this case, the disposition angles of the physical property sensor 7 and the flow rate sensor 8 can coincide with each other, and accordingly, in a manufacturing process of the flow rate measuring device 1, a step of mounting the physical property sensor 7 and the flow rate sensor 8 on the circuit board 5 can be simplified.

(5-2) Modification Example 2

As shown in FIG. 3 (a), the physical property sensor 7 includes: the micro heater 71 that heats the fluid to be measured; and the first physical property thermopile 72 and the second physical property thermopile 73 which detect the temperature of the fluid to be measured, and the first physical property thermopile 72 and the second physical property thermopile 73 are disposed bilaterally symmetrically while sandwiching the micro heater 71 therebetween.

FIG. 9 is a top view showing a schematic configuration of a modification example of the physical property sensor 7 shown in FIG. 3 (*a*). As shown in FIG. 9, the second physical property thermopile 73 may be omitted, and a physical property sensor 7*a* may include the micro heater 71 and the first physical property thermopile 72.

As described above, the physical property sensor 7*a*, in which the micro heater 71 and the first physical property thermopile 72 are disposed side by side in the direction orthogonal to the flow direction of the fluid to be measured, is used, whereby the manufacturing cost of the physical property sensor 7*a* can be reduced.

Based on FIG. 10 (*a*) to FIG. 10 (*c*), a flow rate measuring device 1*a* is described as follows. Note that the same reference numerals are assigned to similar members to those of the flow rate measure device 1 of FIG. 1(*a*) and FIG. 1(*b*), and a description thereof is omitted.

The flow rate measuring device 1*a* is different from the flow rate measuring device 1 mainly in that the flow rate sensor 8 is disposed in the main flow path 21*a*.

Figure 10:
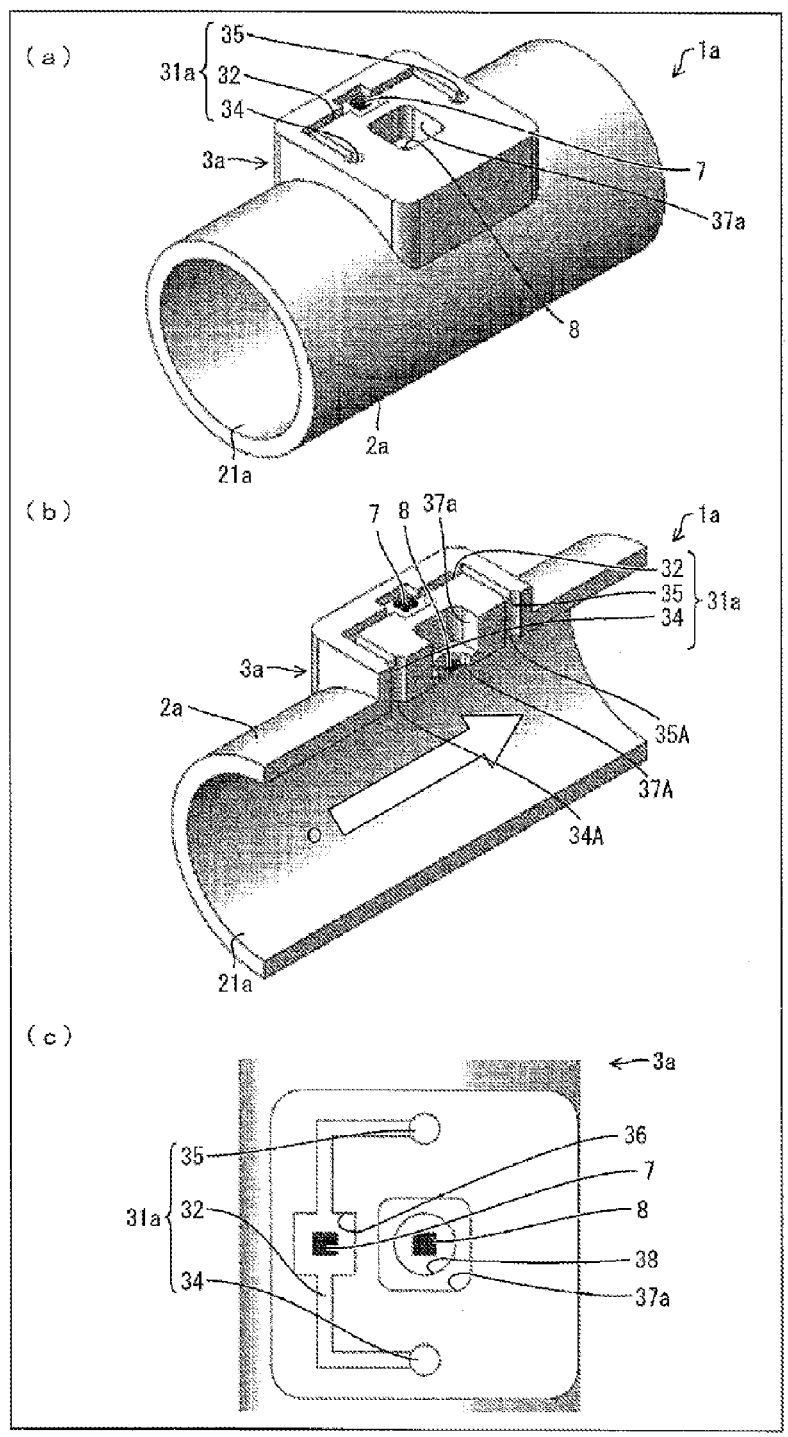
FIG. 10 (a) is a perspective view showing a flow rate measuring device according to an embodiment, FIG. 10 (b) is a cross-sectional view showing the flow rate measuring device shown in FIG. 10 (a), and FIG. 10 (c) is a top view showing a sub-flow path portion shown in FIG. 10 (a).

FIG. 10 (*a*) is a perspective view showing a flow rate measuring device 1*a*, FIG. 10 (*b*) is a cross-sectional view showing the flow rate measuring device 1*a* shown in FIG. 10 (*a*), and FIG. 10 (*c*) is a top view showing a sub-flow path portion 3*a* shown in FIG. 10 (*a*).

As shown in FIG. 10 (*a*) to FIG. 10 (*c*), in the flow rate measuring device 1*a*, an opening portion 37A is further formed between the inflow port 34A and the outflow port 35A which are formed on an inner circumferential surface of a main flow path portion 2*a*.

In the sub-flow path portion 3*a*, a cell-like flow rate detection region 37*a* in which the flow rate sensor 8 is disposed is formed, and the flow rate detection region 37*a* is in fluid communication with the opening portion 37A. Therefore, the fluid to be measured, which flows the main flow path 21*a* through the opening portion 37A, flows into the flow rate detection region 37*a*, and the flow rate thereof is detected by the flow rate sensor 8.

Note that, by adjusting a size of the opening portion 37A, the flow rate of the fluid to be measured which flows from the main flow path 21*a* into the flow rate detection region 37*a*, can be controlled.

The sub-flow path 31*a* includes the inflow flow path 34, the physical property detecting flow path 32 and the outflow flow path 35. The physical property detecting flow path 32 has the physical property detection region 36, in which the physical property sensor 7 for detecting the physical property of the fluid to be measured is disposed, in a flow path extending in parallel to the flow direction O of the fluid to be measured in the main flow path 21*a*.

As described above, in the flow rate measuring device 1*a*, the physical property sensor 7 is disposed in the sub-flow path 31*a*, and the flow rate sensor 8 is disposed in the main flow path 21*a*. Therefore, in the flow rate measuring device 1*a*, the flow rates corresponding to the detection ranges of the physical property sensor 7 and the flow rate sensor 8 can be individually controlled. Accordingly, it is possible to suppress the output characteristics of the physical property sensor 7 from being changed by the influence of the flow rate of the fluid to be measured.

Therefore, the flow rate measuring device 1*a* capable of measuring with high accuracy the flow rate of the fluid to be measured, by reducing the change of the output characteristics caused by the physical property change of the fluid to be measured, can be realized.

Based on FIG. 11 (*a*) and FIG. 11 (*b*), a flow rate measuring device 1*b* is described as follows. Note that the same reference numerals are assigned to similar members to those of the flow rate measuring devices 1 and 1*a*, and a description thereof is omitted.

The flow rate measuring device 1*b* is different from the flow rate measuring devices 1 and 1*a* in that the flow rate measuring device 1*b* includes two independent sub-flow paths 31*b* and 31B.

Figure 11:
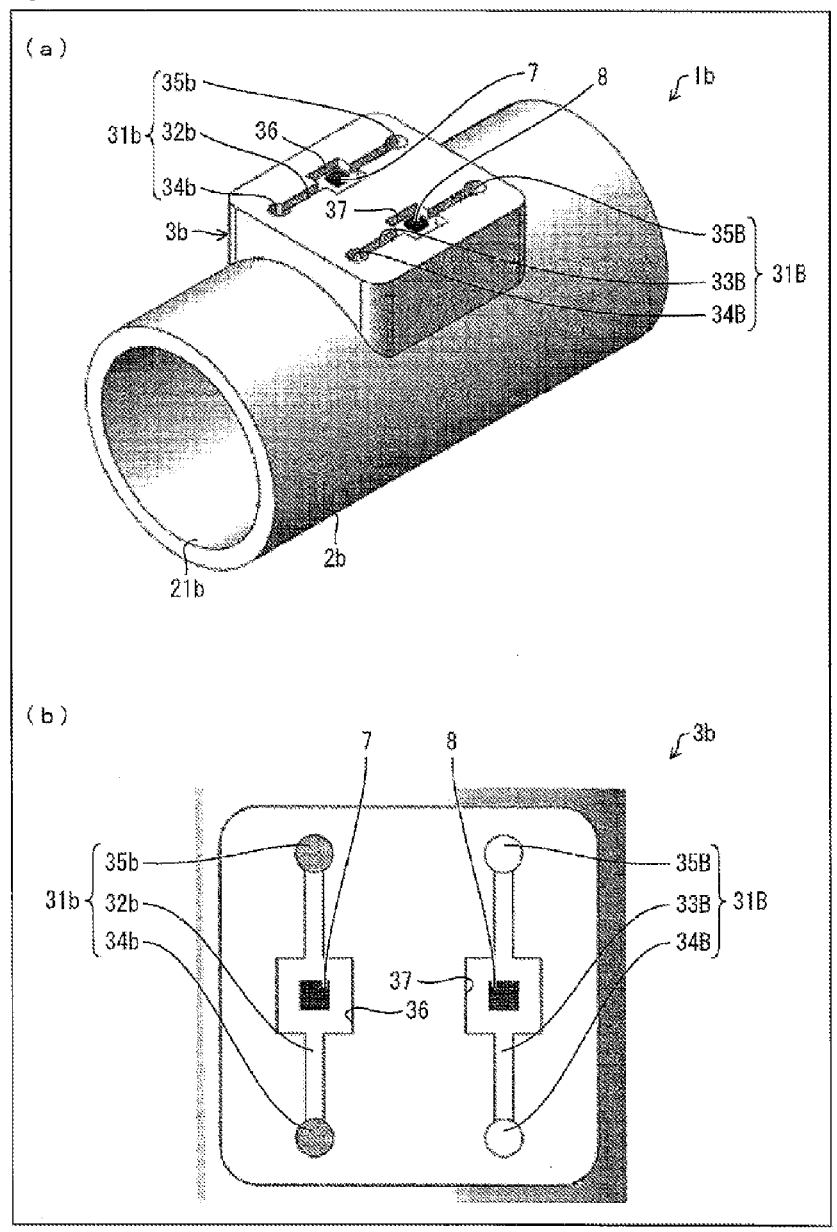
FIG. 11 (a) is a perspective view showing a flow rate measuring device according to an embodiment, and FIG. 11 (b) is a top view showing a sub-flow path portion shown in FIG. 11 (a).

FIG. 11 (*a*) is a perspective view showing a flow rate measuring device 1*b*, and FIG. 11 (*b*) is a top view showing a sub-flow path portion 3*b* shown in FIG. 11 (*a*).

As shown in FIG. 11 (*a*) and FIG. 11 (*b*), in the flow rate measuring device 1*b*, the sub-flow path portion 3*b* has a first sub-flow path 31*b* and a second sub-flow path 31B formed inside and on an upper surface thereof.

The first sub-flow path 31*b* includes an inflow flow path 34*b*, a physical property detecting flow path 32*b*, and an outflow flow path 35*b*. The physical property detecting flow path 32*b* extends in parallel to a flow direction of the fluid to be measured in a main flow path 21*b*, and has the physical property detection region 36 in which the physical property sensor 7 for detecting the physical property of the fluid to be measured is disposed.

The second sub-flow path 31B includes an inflow flow path 34B, a flow rate detecting flow path 33B, and an outflow flow path 35B. The flow rate detecting flow path 33B extends in parallel to the flow direction of the fluid to be measured in the main flow path 21*b*, and has the flow rate detection region 37 in which the flow rate sensor 8 for detecting the flow rate of the fluid to be measured is disposed.

As described above, in the flow rate measuring device 1*b*, the sub-flow path portion 3*b* includes the first sub-flow path 31*b* and the second sub-flow path 31B, each of which is an independent sub-flow path. The physical property sensor 7 is disposed in the first sub-flow path 31*b*, and the flow rate sensor 8 is disposed in the second sub-flow path 31B. Therefore, in the flow rate measuring device 1*b*, the flow rates corresponding to the detection ranges of the physical property sensor 7 and the flow rate sensor 8 can be individually controlled. Accordingly, it is possible to suppress the output characteristics of the physical property sensor 7 from being changed by the influence of the flow rate of the fluid to be measured.

Therefore, the flow rate measuring device 1*b* capable of measuring with high accuracy the flow rate of the fluid to be measured, by reducing the change of the output characteristics caused by the physical property change of the fluid to be measured, can be realized.

Based on FIG. 12 (*a*) to FIG. 12 (*c*), a flow rate measuring device 1*c* is described as follows. Note that the same reference numerals are assigned to similar members to those of the flow rate measuring devices 1, 1*a* and 1*b*, and a description thereof is omitted.

The flow rate measuring device 1*c* is different from the flow rate measuring devices 1, 1*a*, and 1*b* in that the physical property detecting flow path is formed in the flow rate detecting flow path.

Figure 12:
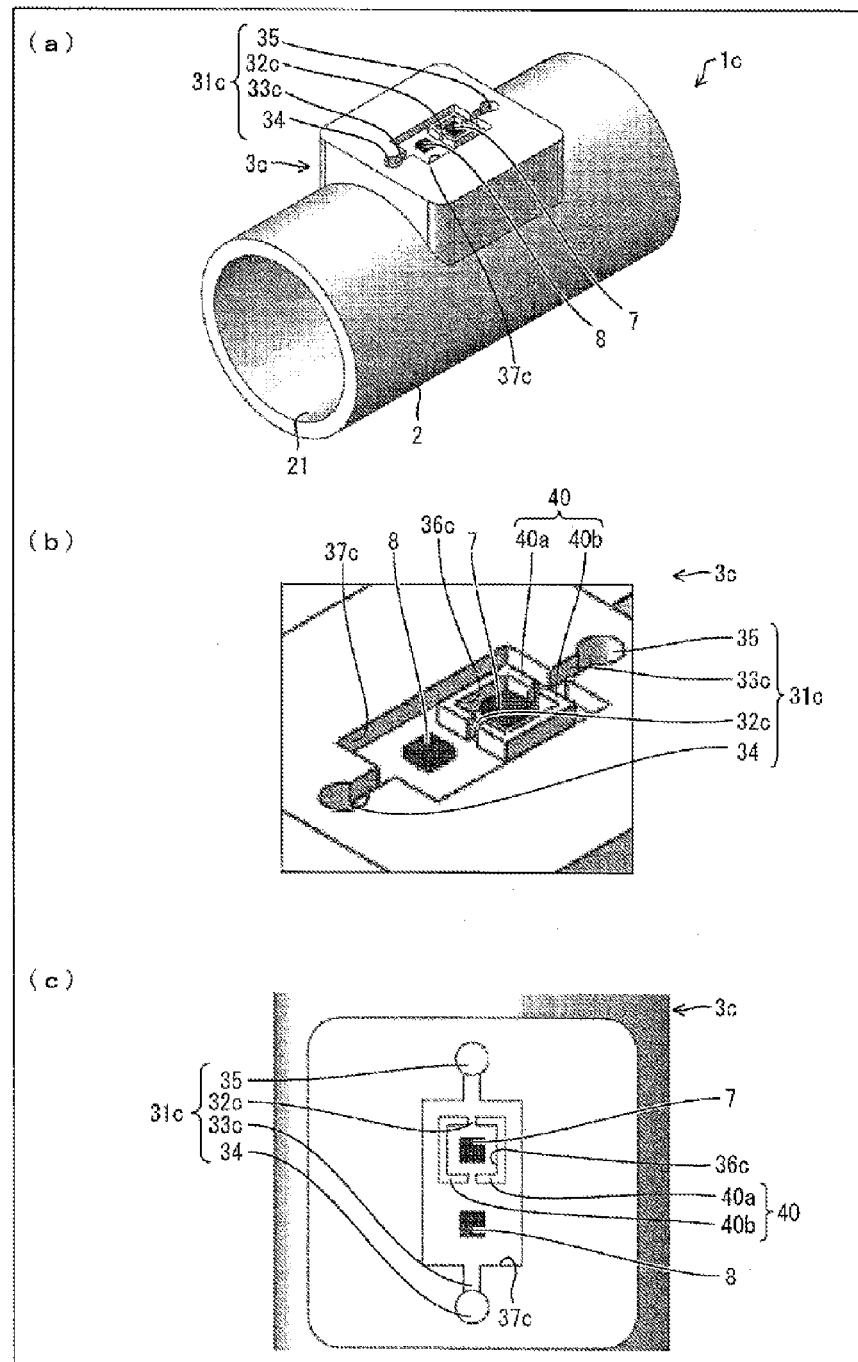
FIG. 12 (a) is a perspective view showing a flow rate measuring device according to an embodiment, FIG. 12 (b) is a perspective view showing a sub-flow path portion shown in FIG. 12 (a), and FIG. 12 (c) is a top view showing the sub-flow path portion shown in FIG. 12 (b).
Figure 13:
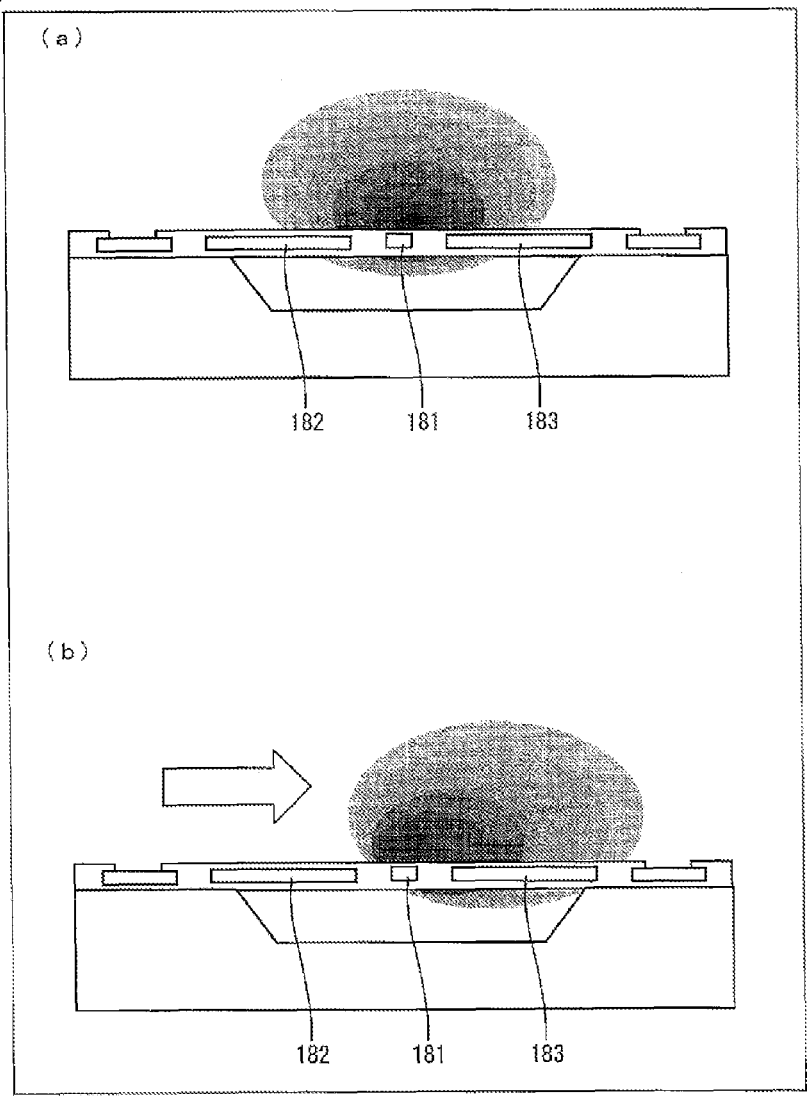
FIG. 13 (*a*) and FIG. 13 (*b*) are schematic views for explaining a change of a temperature distribution in a thermal flow rate measuring device, FIG. 13 (*a*) shows a temperature distribution in a state where a fluid to be measured does not flow, and FIG. 13 (*b*) shows a temperature distribution in a state where the fluid to be measured flows.
Figure 14:
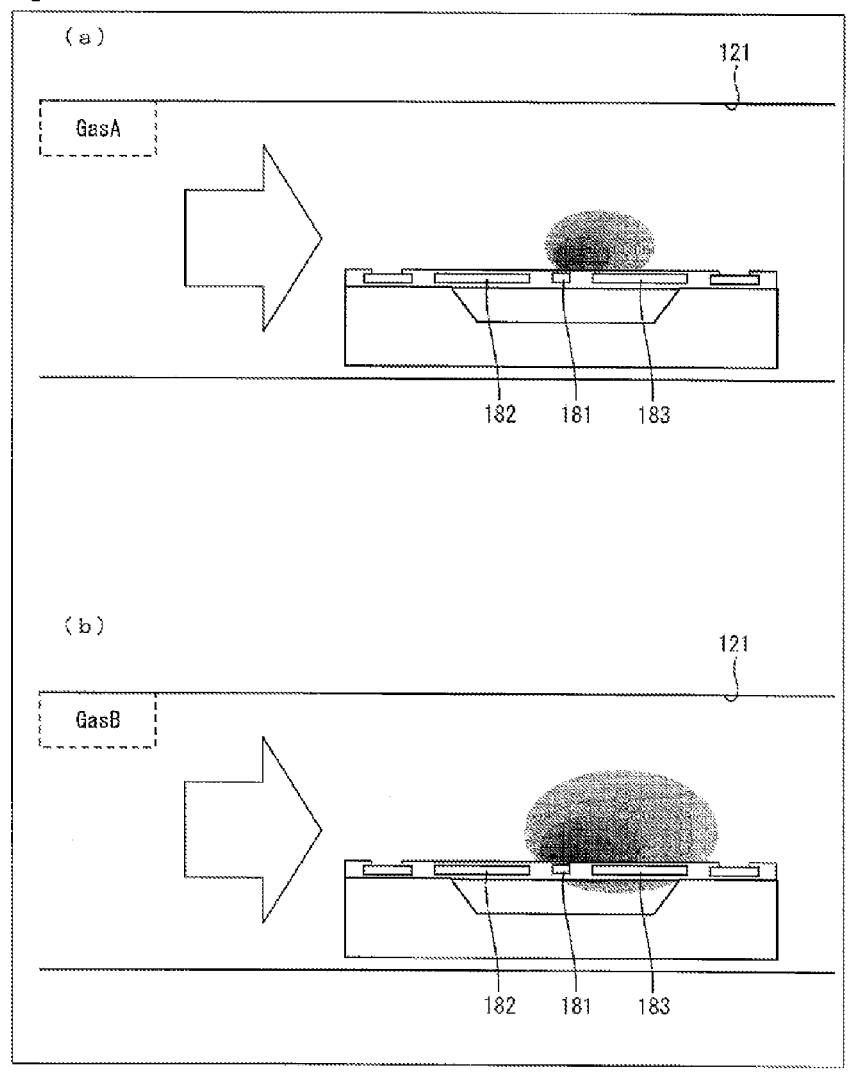
FIG. 14 (*a*) and FIG. 14 (*b*) are schematic views showing temperature distributions when Gas A and Gas B, which have different physical properties, individually flow through a flow path at a predetermined flow rate (L/min).
Figure 15:
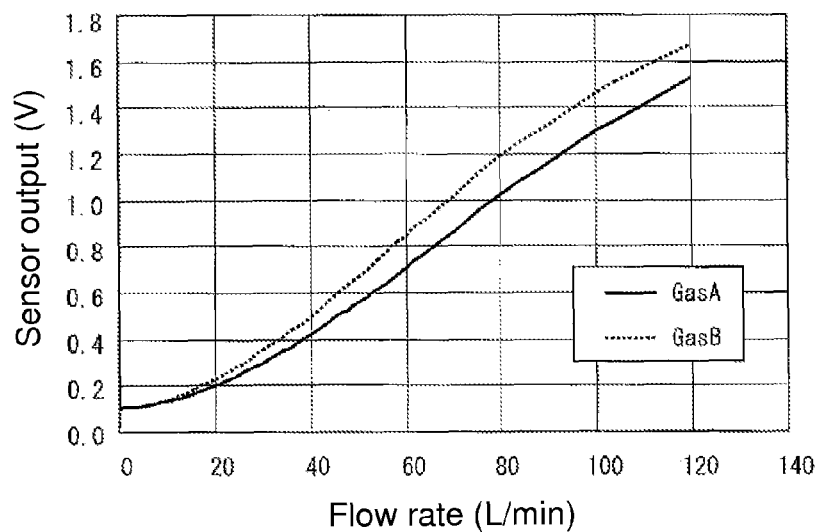
FIG. 15 is a graph showing relationships between flow rates (L/min) of the Gas A and the Gas B, which are shown in FIG. 14 (*a*) and FIG. 14 (*b*), and output values (V) of the flow rate measuring device.
Figure 16:
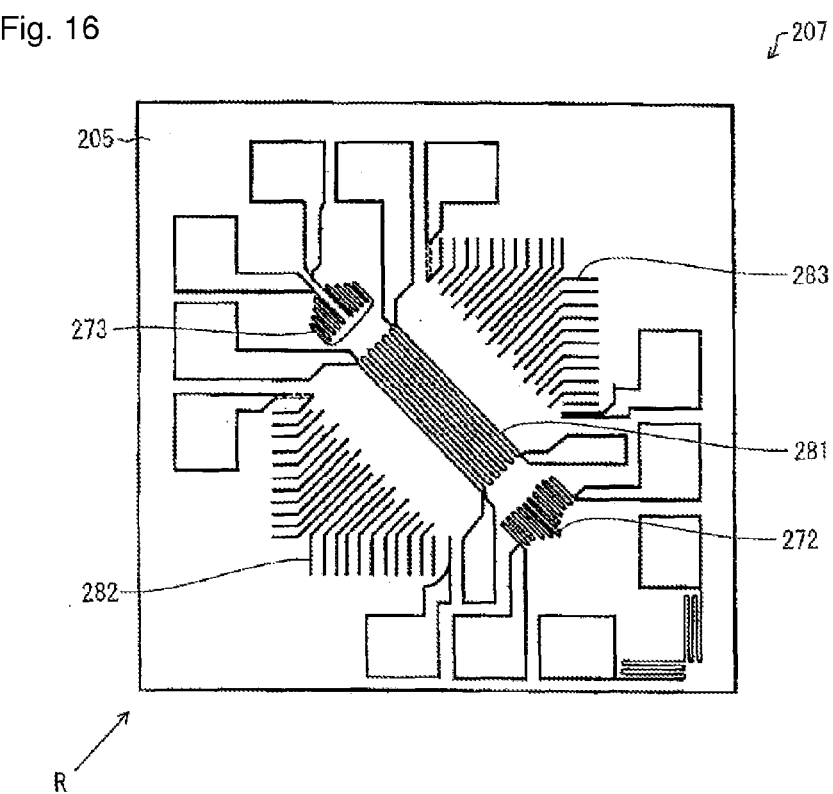
FIG. 16 is a top view showing a configuration of a micro flow sensor provided in a conventional flow rate measuring device.
Figure 17:
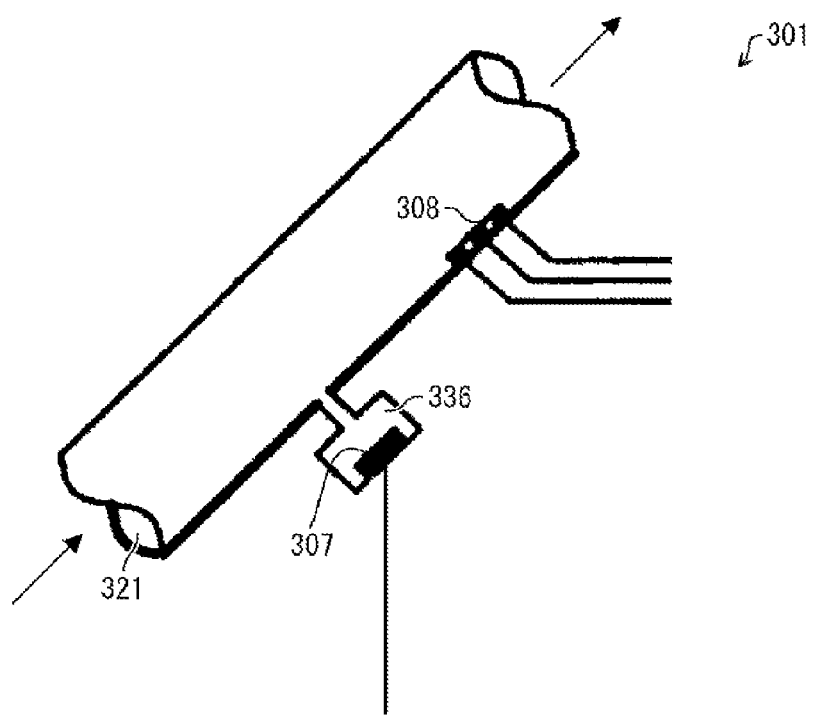
FIG. 17 is a perspective view showing an exterior appearance of a conventional flow rate measuring device.

FIG. 12 (*a*) is a perspective view showing a flow rate measuring device 1*c*. FIG. 12 (*b*) is a perspective view showing a sub-flow path portion 3*c* shown in FIG. 12 (*a*), and FIG. 12 (*c*) is a top view showing the sub-flow path portion 3*c* shown in FIG. 12 (*b*).

As shown in FIG. 12 (*a*) to FIG. 12 (*c*), in the flow rate measuring device 1*c*, the sub-flow path portion 3*c* has a sub-flow path 31*c* formed inside and on an upper surface thereof.

The sub-flow path 31c includes the inflow flow path 34, a physical property detecting flow path 32c, a flow rate detecting flow path 33c, and the outflow flow path 35.

In the sub-flow path 31c, the physical property detecting flow path 32c is formed in a flow rate detection region 37c in the flow rate detecting flow path 33c. With respect to the flow direction of the fluid to be measured, the flow rate sensor 8 is disposed on an upstream side, and the physical property sensor 7 is disposed on a downstream side.

Here, the physical property detecting flow path 32c is partitioned from the flow rate detecting flow path 33c (flow rate detection region 37c) by a flow rate control member 40 for controlling the flow rate of the fluid to be measured. The physical property sensor 7 is disposed inside the flow rate control member 40.

The flow rate control member 40 is for controlling the flow rate of the fluid to be measured which passes through a physical property detection region 36c. The flow rate control member 40 includes a first sidewall portion 40a and a second sidewall portion 40b. Each of the first sidewall portion 40a and the second sidewall portion 40b is a substantially U-shaped plate-like member, and the first sidewall portion 40a and the second sidewall portion 40b are disposed at a predetermined interval in a state where respective end portions thereof are opposed to each other. Therefore, by adjusting the interval between the first sidewall portion 40a and the second sidewall portion 40b, the flow rate of the fluid to be measured which passes through the flow rate control member 40, that is, the physical property detection region 36c can be controlled.

As described above, in the flow rate measuring device 1c, the flow rate control member 40 is provided in the sub-flow path 31c formed in the sub-flow path portion 3c, and the physical property sensor 7 is disposed inside the flow rate control member 40. Therefore, it is made possible to define an arbitrary position in the sub-flow path 31c as the physical property detection region 36c. Moreover, by providing the flow rate control member 40, the flow rate of the fluid to be measured which passes through the physical property detection region 36c inside the flow rate control member 40, can be controlled with ease.

Hence, as in the flow rate measuring device 1c, even if such a configuration in which the physical property detecting flow path 32c is formed in the flow rate detecting flow path 33c is adopted, the flow rates corresponding to the detection ranges of the physical property sensor 7 and the flow rate sensor 8 can be individually controlled. Accordingly, it is possible to suppress the output characteristics of the physical property sensor 7 from being changed by the influence of the flow rate of the fluid to be measured.

Therefore, the flow rate measuring device 1c capable of measuring with high accuracy the flow rate of the fluid to be measured, by reducing the change of the output characteristics caused by the physical property change of the fluid to be measured, can be realized.

The present invention is not limited to the above-mentioned embodiments, and can be modified in a various ways within the scope defined by claims. Embodiments obtained by appropriately combining technical means, which are individually disclosed in the different embodiments, are also incorporated in the technical scope of the present invention.

As described above, the flow rate measuring device includes: the flow rate detection unit configured to detect the flow rate of the fluid to be measured, which flows through the main flow path; the physical property detection unit configured to detect the physical property of the fluid to be measured, the physical property detection unit having the heating unit configured to heat the fluid to be measured and the temperature detection unit configured to detect the temperature of the fluid to be measured; the sub-flow path portion, in which one end is in fluid communication with the first inflow port open in the main flow path, and the other end is in fluid communication with the first outflow port open in the main flow path, the sub-flow path portion having the physical property detection flow path in which the physical property detection unit is disposed; and the flow rate correction unit configured to correct the flow rate of the fluid to be measured, which is calculated based on the detection signal outputted from the flow rate detection unit, by using the physical property of the fluid to be measured, which is calculated based on the detection signal outputted from the physical property detection unit, wherein the heating unit and the temperature detection unit are disposed side by side in the direction orthogonal to the flow direction of the fluid to be measured, and the flow rate detection unit is disposed at the position except for the physical cal property detection flow path.

In the above-described configuration, the physical property detection unit is disposed in the physical property detection flow path, and the flow rate detection unit is disposed at the position except for the physical property detection flow path. Therefore, for example, the width of the physical property detection flow path is adjusted, whereby it is made possible to individually control the flow rate of the fluid to be measured, which flows through the physical property detection flow path. In such a way, the output characteristics of the physical property detection unit can be suppressed from being changed by the influence of the flow rate of the fluid to be measured, and in addition, it is made possible to effectively suppress the generation of the turbulence, which is caused by the flow of the fluid to be measured.

Hence, in accordance with the above-described configuration, the flow rate correction unit can accurately correct the flow rate of the fluid to be measured, which is calculated based on the detection signal outputted from the flow rate detection unit, by using the physical property with high accuracy, which is calculated based on the detection signal outputted from the physical property detection unit.

Moreover, in the above-described configuration, the physical property detection unit is disposed in the physical property detection flow path, in which one end is in fluid communication with the first inflow port open in the main flow path, and the other end is in fluid communication with the first outflow port open in the main flow path. Therefore, the flow of the fluid to be measured in the physical property detection flow path is not stagnated, and the fluid to be measured flows smoothly from the first inflow port to the first outflow port, and accordingly, the substitution of the fluid to be measured which is present on the periphery of the physical property detection unit can be performed efficiently.

Hence, in accordance with the above-described configuration, it is possible to correct the flow rate of the fluid to be measured, based on the appropriate physical property corresponding to the change of the physical property of the fluid to be measured, which flows through the main flow path.

Moreover, in the above-described configuration, the heating unit and the temperature detection unit, which are provided in the physical property detection unit, are disposed side by side in the direction orthogonal to the flow direction of the fluid to be measured. The temperature distribution is biased to the downstream side by the flow of the fluid to be measured, and accordingly, the variation of the temperature distribution in the direction orthogonal to the flow direction is small in comparison with the variation of the temperature distribution in the flow direction of the fluid to be measured.

Therefore, the heating unit and the temperature detection unit are disposed side by side in the direction orthogonal to the flow direction of the fluid to be measured, whereby the change of the output characteristics of the temperature detection unit, which is caused by the change of the temperature distribution, can be reduced.

Hence, in accordance with the above-described configuration, the influence of the change of the temperature distribution caused by the flow of the fluid to be measured, is reduced, whereby it is possible to enhance the detection accuracy by the physical property detection unit.

Therefore, the flow rate measuring device capable of measuring with high accuracy the flow rate of the fluid to be measured, by reducing the change of the output characteristics caused by the physical property change of the fluid to be measured, can be realized.

Moreover, in the flow rate measuring device, preferably, the sub-flow path portion further includes the flow rate detection flow path in which the flow rate detection unit is disposed, and in the flow rate detection flow path, one end thereof is in fluid communication with the first inflow port, the other end thereof is in fluid communication with the first outflow port, and the sub-flow path portion branches the fluid to be measured, which flows thereinto from the first inflow port, to the physical property detection flow path and the flow rate detection flow path.

In the above-described configuration, the sub-flow path portion further includes the flow rate detection flow path in which the flow rate detection unit is disposed, and the sub-flow path portion branches the fluid to be measured, which flows thereinto from the inflow port, individually to the physical property detection flow path and the flow rate detection flow path. As described above, the fluid to be measured, which flows from the same inflow port, is branched to the physical property detection flow path and the flow rate detection flow path, whereby the physical property detection unit and the flow rate detection unit can detect the physical property and the flow rate based on the fluid to be measured, in which the conditions such as temperatures and concentrations are equal to each other.

Moreover, for example, the widths of the physical property detection flow path and the flow rate detection path are adjusted, whereby it is made possible to individually control the flow rates of the fluid to be measured, which flows through the physical property detection flow path and the flow rate detection path.

Hence, in accordance with the above-described configuration, the measurement accuracy of the flow rate measuring device can be enhanced.

Moreover, in the flow rate measuring device, preferably, the physical property detection flow path is provided in the flow rate detection flow path, and a part of the fluid to be measured, which flows through the flow rate detection flow path, flows into the physical property detection flow path.

In the above-described configuration, the physical property detection flow path is provided in the flow rate detection flow path, and a part of the fluid to be measured, which flows through the flow rate detection flow path, flows into the physical property detection flow path. Therefore, the physical property detection unit and the flow rate detection unit become capable of detecting the physical property and the flow rate based on the flows of the fluid to be measured, in which the conditions such as the temperatures and the concentrations are equal to each other, and in addition, capable of reducing ratios of the physical property detection flow path and the flow rate detection flow path, which are occupied in the sub-flow path portion.

Hence, in accordance with the above-described configuration, the measurement accuracy of the flow rate measuring device can be enhanced, and in addition, miniaturization of the flow rate measuring device can be achieved.

Moreover, in the flow rate measuring device, preferably, the sub-flow path portion further includes the flow rate detection flow path in which the flow rate detection unit is disposed, and the flow rate detection flow path has one end thereof communicating with a second inflow port open in the main flow path, and the other end communicating with a second outflow port open in the main flow path.

In the above-described configuration, the sub-flow path portion further includes the flow rate detection flow path in which one end is in fluid communication with the second inflow port open in the main flow path and the other end is in fluid communication with the second outflow port open in the main flow path. That is to say, the sub-flow path portion has two independent sub-flow paths, i.e. the physical property detection flow path and the flow rate detection flow path. Therefore, the widths of the physical property detection flow path and the flow rate detection path are individually adjusted, whereby it is made possible to individually control the flow rates of the fluid to be measured which flows through the physical property detection flow path and the flow rate detection unit.

Hence, in accordance with the above-described configuration, the physical property detection flow path and the flow rate detection flow path can be individually provided at optimum positions with respect to the main flow path, and accordingly, the measurement accuracy of the flow rate measuring device can be enhanced.

Moreover, in the flow rate measuring device, preferably, the flow rate detection unit is disposed in the main flow path.

In the above-described configuration, the physical property detection unit is disposed in the physical property detection flow path, and the flow rate detection unit is disposed in the main flow path. Therefore, the flow rate of the fluid to be measured, which flows through the physical property detection flow path, is controlled, whereby the output characteristics of the physical property detection unit can be suppressed from being changed by the influence of the flow rate of the fluid to be measured.

Hence, in accordance with the above-described configuration, the configuration of the sub-flow path portion can be simplified, and in addition, the measurement accuracy of the flow rate measuring device can be enhanced.

Moreover, in the flow rate measuring device, preferably, the heating unit is disposed so that a longitudinal direction thereof is along the flow direction of the fluid to be measured.

In the above-described configuration, the heating unit is disposed so that the longitudinal direction thereof is along the flow direction of the fluid to be measured. Accordingly, the heating unit becomes capable of heating the fluid to be measured over a wide range across the flow direction of the fluid to be measured. Therefore, even in the case where the temperature distribution is biased to the downstream side by the flow of the fluid to be measured, it becomes easy to detect the temperature of the fluid to be measured by the temperature detection unit. Hence, the change of the output characteristics of the temperature detection unit can be reduced.

Hence, in accordance with the above-described configuration, the influence of the change of the temperature distribution, which is caused by the flow of the fluid to be measured, is reduced, whereby the detection accuracy by the physical property detection unit can be enhanced.

Moreover, in the flow rate measuring device, preferably, the temperature detection unit is disposed so that a longitudinal direction thereof is along the flow direction of the fluid to be measured.

In the above-described configuration, the temperature detection unit is disposed so that the longitudinal direction thereof is along the flow direction of the fluid to be measured. Accordingly, the temperature detection unit becomes capable of detecting the temperature over a wide range across the flow direction of the fluid to be measured. Therefore, even in the case where the temperature distribution is biased to the downstream side by the flow of the fluid to be measured, it becomes easy to detect the temperature of the fluid to be measured by the temperature detection unit. Accordingly, the change of the output characteristics of the temperature detection unit can be reduced.

Hence, in accordance with the above-described configuration, the influence of the change of the temperature distribution, which is caused by the flow of the fluid to be measured, is reduced, whereby the detection accuracy by the physical property detection unit can be enhanced.

INDUSTRIAL APPLICABILITY

The flow rate measuring device according to the present invention can be suitably used for a gas meter, a burning appliance, an automotive internal combustion engine, a fuel cell and the like.

The invention claimed is:

1. A flow rate measuring device comprising:
a flow rate detection unit configured to detect a flow rate of a fluid to be measured the fluid to be measured is the fluid flowing through a main flow path;
a physical property detection unit configured to detect a physical property of the fluid to be measured, the physical property detection unit comprising a heating unit configured to heat the fluid to be measured and a temperature detection unit configured to detect a temperature of the fluid to be measured;
a sub-flow path portion in which one end is in fluid communication with a first inflow port open in the main flow path and the other end is in fluid communication with a first outflow port open in the main flow path, the sub-flow path portion comprising a physical property detection flow path in which the physical property detection unit is disposed; and
a flow rate correction unit configured to correct the flow rate of the fluid to be measured, the flow rate being calculated based on a detection signal outputted from the flow rate detection unit, by using the physical property of the fluid to be measured, the physical property being calculated based on a detection signal outputted from the physical property detection unit, wherein
the heating unit and the temperature detection unit are disposed side by side in a direction orthogonal to a flow direction of the fluid to be measured, and
the flow rate detection unit is disposed at a position except for the physical property detection flow path.

2. The flow rate measuring device according to claim 1, wherein
the sub-flow path portion further comprises a flow rate detection flow path in which the flow rate detection unit is disposed,
one end of the flow rate detection flow path is in fluid communication with the first inflow port, and the other end of the flow rate detection flow path is in fluid communication with the first outflow port, and
the fluid to be measured flowing in from the first inflow port, is branched to the physical property detection flow path and the flow rate detection flow path.

3. The flow rate measuring device according to claim 2, wherein
the physical property detection flow path is provided in the flow rate detection flow path, and
a part of the fluid to be measured flowing through an inside of the flow rate detection flow path, is allowed to flow into the physical property detection flow path.

4. The flow rate measuring device according to claim 1, wherein
the sub-flow path portion further comprises a flow rate detection flow path in which the flow rate detection unit is disposed, and
one end of the flow rate detection flow path is in fluid communication with a second inflow port open in the main flow path, and the other end of the flow rate detection flow path is in fluid communication with a second outflow path open in the main flow path.

5. The flow rate measuring device according to claim 1, wherein the flow rate detection unit is disposed in the main flow path.

6. The flow rate measuring device according to claim 1, wherein the heating unit is disposed so that a longitudinal direction of the heating unit is along the flow direction of the fluid to be measured.

7. The flow rate measuring device according to claim 1, wherein the temperature detection unit is disposed so that a longitudinal direction of the temperature detection unit is along the flow direction of the fluid to be measured.

8. The flow rate measuring device according to claim 2, wherein the heating unit is disposed so that a longitudinal direction of the heating unit is along the flow direction of the fluid to be measured.

9. The flow rate measuring device according to claim 3, wherein the heating unit is disposed so that a longitudinal direction of the heating unit is along the flow direction of the fluid to be measured.

10. The flow rate measuring device according to claim 4, wherein the heating unit is disposed so that a longitudinal direction of the heating unit is along the flow direction of the fluid to be measured.

11. The flow rate measuring device according to claim 5, wherein the heating unit is disposed so that a longitudinal direction of the heating unit is along the flow direction of the fluid to be measured.

12. The flow rate measuring device according to claim 2, wherein the temperature detection unit is disposed so that a longitudinal direction of the temperature detection unit is along the flow direction of the fluid to be measured.

13. The flow rate measuring device according to claim 3, wherein the temperature detection unit is disposed so that a longitudinal direction of the temperature detection unit is along the flow direction of the fluid to be measured.

14. The flow rate measuring device according to claim 4, wherein the temperature detection unit is disposed so that a longitudinal direction of the temperature detection unit is along the flow direction of the fluid to be measured.

15. The flow rate measuring device according to claim 5, wherein the temperature detection unit is disposed so that a longitudinal direction of the temperature detection unit is along the flow direction of the fluid to be measured.

* * * * *